United States Patent
Yamamoto et al.

(10) Patent No.: US 9,494,724 B2
(45) Date of Patent: Nov. 15, 2016

(54) LIQUID CRYSTAL DISPLAY DEVICE

(71) Applicant: Sharp Kabushiki Kaisha, Osaka-shi, Osaka (JP)

(72) Inventors: Emi Yamamoto, Osaka (JP); Tsuyoshi Maeda, Osaka (JP); (Continued)

(73) Assignee: Sharp Kabushiki Kaisha, Osaka (JP)

( * ) Notice: Subject to any disclaimer, the term of this patent is extended or adjusted under 35 U.S.C. 154(b) by 88 days.

(21) Appl. No.: 14/353,822

(22) PCT Filed: Oct. 19, 2012

(86) PCT No.: PCT/JP2012/077083
§ 371 (c)(1),
(2) Date: Apr. 24, 2014

(87) PCT Pub. No.: WO2013/061875
PCT Pub. Date: May 2, 2013

(65) Prior Publication Data
US 2014/0253844 A1    Sep. 11, 2014

(30) Foreign Application Priority Data
Oct. 28, 2011    (JP) .................................. 2011-237848

(51) Int. Cl.
*F21V 8/00*    (2006.01)
*G02F 1/1335*    (2006.01)

(52) U.S. Cl.
CPC ............. *G02B 6/005* (2013.01); *G02B 6/0051* (2013.01); *G02F 1/133504* (2013.01); (Continued)

(58) Field of Classification Search
CPC .................... G02F 1/133504; G02F 1/133606; G02F 1/133615; G02F 2001/133562; G02B 6/005; G02B 6/0051
See application file for complete search history.

(56) References Cited

U.S. PATENT DOCUMENTS

| 5,481,385 A | 1/1996 | Zimmerman et al. |
| 5,877,829 A | 3/1999 | Okamoto et al. |

(Continued)

FOREIGN PATENT DOCUMENTS

| JP | 04-146401 A | 5/1992 |
| JP | 07-509327 A | 10/1995 |

(Continued)

OTHER PUBLICATIONS

Official Communication issued in International Patent Application No. PCT/JP2012/077083, mailed on Jan. 15, 2013.

*Primary Examiner* — Richard Kim
*Assistant Examiner* — Kendrick Hsu
(74) *Attorney, Agent, or Firm* — Keating & Bennett, LLP

(57) ABSTRACT

A liquid crystal display device includes a liquid crystal panel, a pair of polarizing layers, a lighting device, and an output angle control member. The liquid crystal panel includes a pair of substrates, and a liquid crystal layer. The liquid crystal layer is interposed between the pair of substrates. The pair of polarizing layers is arranged on a light input side and a light output side of the liquid crystal layer. The lighting device is arranged on the light input side of the liquid crystal panel and radiates light toward the liquid crystal panel. The output angle control member is arranged on the light output side of the liquid crystal panel and controls an output angle of light which is output from the liquid crystal panel. An azimuth angle direction in which a view angle of the liquid crystal panel is relatively narrow and an azimuth angle direction in which an intensity of light which is radiated toward the liquid crystal panel from the lighting device is relatively small approximately match in an (Continued)

azimuth angle direction which is viewed from a direction normal to the liquid crystal panel.

18 Claims, 21 Drawing Sheets

(72) Inventors: Toru Kanno, Osaka (JP); Tsuyoshi Kamada, Osaka (JP); Shohei Katsuta, Osaka (JP)

(52) U.S. Cl.
CPC ... *G02F 1/133606* (2013.01); *G02F 1/133615* (2013.01); *G02F 2001/133562* (2013.01)

(56) References Cited

U.S. PATENT DOCUMENTS

| | | | |
|---|---|---|---|
| 6,010,747 A | 1/2000 | Beeson et al. | |
| 6,417,966 B1* | 7/2002 | Moshrefzadeh | G03B 21/62 359/453 |
| 6,717,645 B2* | 4/2004 | Shimoshikiryou | G02F 1/1393 345/87 |
| 7,804,564 B2* | 9/2010 | Min | G02B 3/0043 349/112 |
| 2005/0128579 A1* | 6/2005 | Thomas | B29C 70/745 359/443 |
| 2008/0285135 A1 | 11/2008 | Kurt | |
| 2010/0245737 A1 | 9/2010 | Aoyama et al. | |
| 2011/0019128 A1* | 1/2011 | Takata | G02B 3/0043 349/62 |
| 2011/0128472 A1* | 6/2011 | Hirata | G02F 1/13471 349/62 |

FOREIGN PATENT DOCUMENTS

| | | |
|---|---|---|
| JP | 09-197405 A | 7/1997 |
| JP | 2001-505497 A | 4/2001 |
| JP | 2004-046243 A | 2/2004 |
| JP | 2007-514975 A | 6/2007 |
| JP | 2008-096458 A | 4/2008 |
| JP | 2008-250163 A | 10/2008 |
| WO | 2009/044521 A1 | 4/2009 |

* cited by examiner

LIQUID CRYSTAL DISPLAY DEVICE

TECHNICAL FIELD

The present invention relates to a liquid crystal display device.

The present application claims priority based on Japanese Patent Application No. 2011-237848 filed Oct. 28, 2011 in Japan, and contents thereof are quoted here.

BACKGROUND ART

A liquid crystal display device has been widely used as a display of a mobile electronic device including a mobile phone, a television, a personal computer, or the like. In general, the liquid crystal display device exhibits excellent display characteristics when viewed from the front side. On the other hand, when diagonally viewed, contrast thereof is lowered, or a phenomenon in which grayscale is inverted in a grayscale display (grayscale inversion) occurs. It has been known that a view angle of a liquid crystal display device is narrow, and various studies for widening the view angle have been done. As one of the studies, a configuration of providing, on a viewing side of a display panel, a member for scattering light which is output from a liquid crystal panel has been proposed.

For example, in the following PTL 1, a liquid crystal display device including a liquid crystal display panel, a backlight which radiates light from the rear surface side of the liquid crystal display panel, and a light diffusion film which is arranged on a viewing side of the liquid crystal display panel is disclosed. In the liquid crystal display device, it is possible to suppress occurrence of grayscale inversion by optimizing a refractive index of internally scattered materials which are scattered in the light diffusion film.

CITATION LIST

Patent Literature

PTL 1: Japanese Unexamined Patent Application Publication No. 2008-250163

SUMMARY OF INVENTION

Technical Problem

In general, light from a backlight is not parallel light, and has some angular distribution.

Accordingly, part of light from the backlight is diagonally input to a liquid crystal display panel. Birefringence of liquid crystal molecules changes according to a transmission direction of light. As a result, light which is perpendicularly input to the liquid crystal display panel when the liquid crystal molecules are in a uniform orientation does not penetrate a polarizing plate on the output side, however, light which is diagonally input to the liquid crystal display panel penetrates the polarizing plate on the output side. That is, even though the liquid crystal display panel exhibits a black display when viewed from the front side, a contrast ratio of the liquid crystal display panel is lowered when diagonally viewed due to a leak of light. Since a liquid crystal display device described in PTL 1 includes a light diffusion film, light which is leaked in the diagonal direction of the liquid crystal display panel when exhibiting a black display diffuses also in the front direction. As a result, a contrast ratio of the liquid crystal display panel on the front side is lowered.

An aspect of the present invention has been made in order to solve the above described problems, and an object of the invention is to realize a liquid crystal display device in which grayscale inversion that is caused when a liquid crystal panel is viewed from the diagonal direction is suppressed, and which has excellent view angle characteristics.

Solution to Problem

A liquid crystal display device according to an aspect of the present invention includes a liquid crystal panel including a pair of substrates and a liquid crystal layer which is interposed between the pair of substrates; a pair of polarizing layers which are arranged on a light input side and a light output side of the liquid crystal layer; a lighting device which is arranged on the light input side of the liquid crystal panel and radiates light toward the liquid crystal panel; and an output angle control member which is arranged on the light output side of the liquid crystal panel and controls an output angle of light which is output from the liquid crystal panel, in which an azimuth angle direction in which a view angle of the liquid crystal panel is relatively narrow, and an azimuth angle direction in which an intensity of light which is radiated toward the liquid crystal panel from the lighting device is relatively small approximately match in an azimuth angle direction which is viewed from a direction normal to the liquid crystal panel.

In the liquid crystal display device according to the aspect of the present invention, among a plurality of iso-contrast curves which denote view angle dependency of contrast of the liquid crystal panel, at least an iso-contrast curve of which contrast is relatively high may have a rotationally asymmetric shape in the azimuth angle direction which is viewed from the direction normal to the liquid crystal panel, and the azimuth angle direction in which a view angle of the liquid crystal panel is relatively narrow may be an azimuth angle direction in which a region surrounded with the iso-contrast curve having the rotationally asymmetric shape is relatively narrow.

In the liquid crystal display device according to the aspect of the present invention, among a plurality of iso-luminance curves which denote a luminance distribution of light which is output from the lighting device, at least an iso-luminance curve of which luminance is relatively high may have a rotationally asymmetric shape in the azimuth angle direction which is viewed from a direction normal to the liquid crystal panel, and the azimuth angle direction in which the intensity of light radiated toward the liquid crystal panel from the lighting device is relatively small may be an azimuth angle direction in which a region surrounded with the iso-luminance curve having the rotationally asymmetric shape is relatively narrow.

In the liquid crystal display device according to the aspect of the present invention, the lighting device may include a light guide which propagates, inside thereof, light input from an end face and which outputs the light from a main face, and a light source which is provided at the end face of the light guide, in which the azimuth angle direction in which the light intensity is relatively small may be a propagation direction of light in the light guide.

The liquid crystal display device according to the aspect of the present invention may further include, on a view side of the output angle control member, a light scattering layer which scatters light output from the output angle control member.

In the liquid crystal display device according to the aspect of the present invention, the light scattering layer may scatter forward isotropically light which is output from the output angle control member.

In the liquid crystal display device according to the aspect of the present invention, the azimuth angle direction in which the view angle of the liquid crystal panel is relatively narrow may match a vertical direction of a display screen of the liquid crystal panel.

The liquid crystal display device according to the aspect of the present invention may further include, on at least one side of the light input side and the light output side of the liquid crystal layer, a phase difference compensation layer which compensates for a phase difference of the liquid crystal layer.

In the liquid crystal display device according to the aspect of the present invention, the output angle control member may include a base with light permeability, light diffusion units which are formed on one face of the base, and a light shielding unit which is formed on the one face of the base in a region other than a region where the light diffusion units are formed, each of the light diffusion units may have a light output end face on the base side, each of the light diffusion units may have a light input end face with an area larger than an area of the light output end face on a side opposite to the base side, a height of the light diffusion units from the light input end face to the light output end face may be larger than a height of the light shielding unit, and a substance with a refractive index smaller than that of the light diffusion units may be present in a gap between the light diffusion units in a region in which the light diffusion units are not formed.

In the liquid crystal display device according to the aspect of the present invention, the output angle control member may include a plurality of the light diffusion units, and the plurality of light diffusion units may be scattered on one surface of the base.

In the liquid crystal display device according to the aspect of the present invention, the plurality of light diffusion units may be non-cyclically arranged when viewed from a direction normal to the one face of the base.

In the liquid crystal display device according to the aspect of the present invention, a dimension or a shape of the light output end face of at least one light diffusion unit among the plurality of light diffusion units may be different from a dimension or a shape of the light output end face of another light diffusion unit.

In the liquid crystal display device according to the aspect of the present invention, an inclined angle of a side surface of at least one light diffusion unit among the plurality of light diffusion units may be different from an inclined angle of a side surface of another light diffusion unit.

In the liquid crystal display device according to the aspect of the present invention, an inclined angle of a side face of at least one light diffusion unit among the plurality of light diffusion units may be changed toward the light output end face from the light input end face.

In the liquid crystal display device according to the aspect of the present invention, the output angle control member may include a plurality of light shielding units, and the plurality of light shielding units may be scattered on one surface of the base.

In the liquid crystal display device according to the aspect of the present invention, the plurality of light shielding units may be non-cyclically arranged when viewed from the direction normal to one face of the base.

In the liquid crystal display device according to the aspect of the present invention, a dimension or a shape of at least one light shielding unit among the plurality of light shielding units may be different from a dimension or a shape of another light shielding unit.

In the liquid crystal display device according to the aspect of the present invention, a substance having a refractive index smaller than that of the light diffusion unit may be air.

In the liquid crystal display device according to the aspect of the present invention, the light shielding layer may be made of any one of a black resin, black ink, a single metal element, and a multilayer film including a single metal element and metal oxide.

Advantageous Effects of Invention

According to the aspect of the present invention, it is possible to realize a liquid crystal display device in which grayscale inversion that is caused when a liquid crystal panel is viewed from a diagonal direction is suppressed and which has excellent view angle characteristics.

DESCRIPTION OF EMBODIMENTS

First Embodiment

Hereinafter, a first embodiment of the present invention will be described with reference to FIGS. 1 to 13B.

In the embodiment, a liquid crystal display device which includes a transmission liquid crystal panel will be described as an example.

In addition, in all of the drawings below, a contraction scale of a size will be denoted by being differentiated depending on constituent elements, in order to make each constituent element easy to see.

Figure 1:
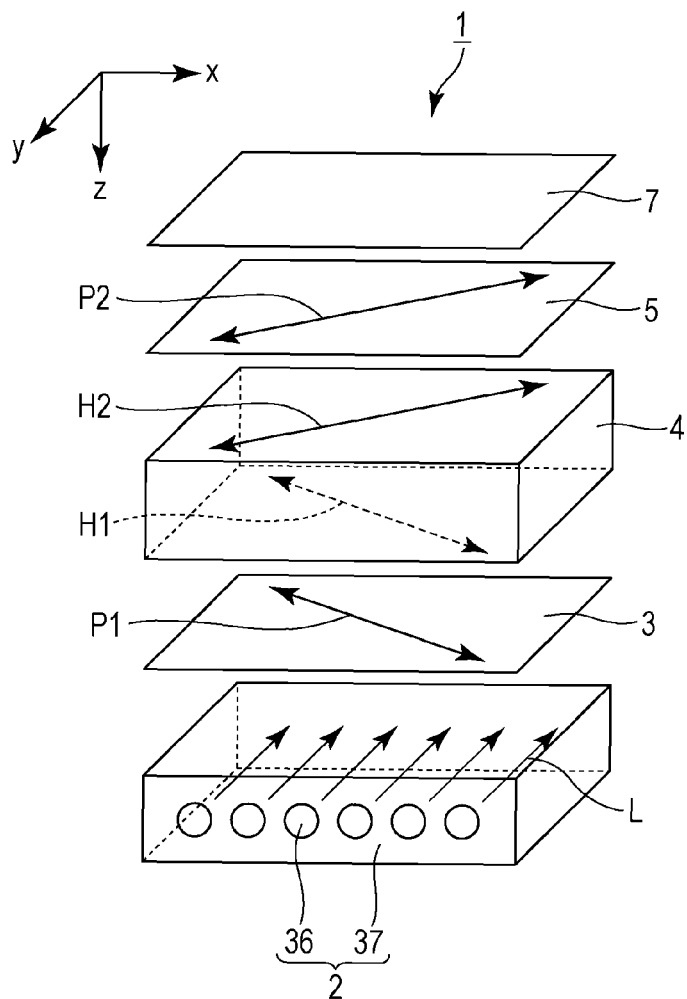
FIG. 1 is a perspective view illustrating a schematic configuration of a liquid crystal display device according to a first embodiment.

FIG. 1 is a perspective view in which the liquid crystal display device according to the embodiment is viewed from the diagonally upper side (view side).

As illustrated in FIG. 1, a liquid crystal display device 1 according to the embodiment includes a backlight 2 (lighting device), a first polarizing plate 3, a liquid crystal panel 4, a second polarizing plate 5, and a light control film 7 (output angle control member). In FIG. 1, the liquid crystal panel 4 is schematically illustrated as one plate shape, however, a detailed structure thereof will be described later.

A viewer views a display from the upper side, at which the light control film 7 is arranged, of the liquid crystal display device 1 in FIG. 1. In descriptions below, the side at which the light control film 7 is arranged will be referred to as a view side, and the side at which the backlight 2 is arranged will be referred to as the rear surface side. In addition, in descriptions below, an x axis will be defined as the horizontal direction of a screen of the liquid crystal display device, a y axis will be defined as the vertical direction of the screen of the liquid crystal display device, and a z axis direction will be defined as the thickness direction of the liquid crystal display device.

In the liquid crystal display device 1 according to the embodiment, light output from the backlight 2 is modulated in the liquid crystal panel 4, and a certain image, character, or the like, is displayed using the modulated light. In addition, when light output from the liquid crystal panel 4 penetrates the light control film 7, the light is output from the light control film 7 in a state in which a light distribution of the output light is widened compared to a state before being input to the light control film 7. Due to this, a viewer is able to view a display with a wide view angle.

Hereinafter, a specific configuration of the liquid crystal panel 4 will be described.

Here, an active matrix liquid crystal panel of a transmission type is described as an example, however, a liquid crystal panel which can be applied to the embodiment is not limited to the active matrix liquid crystal panel of the transmission type. The liquid crystal panel which can be applied to the embodiment may be, for example, a transflective (transmissive and reflective) liquid crystal panel, and may be a simple matrix liquid crystal panel in which each pixel does not include a thin film transistor (hereinafter, abbreviated to TFT) for switching.

Figure 3:
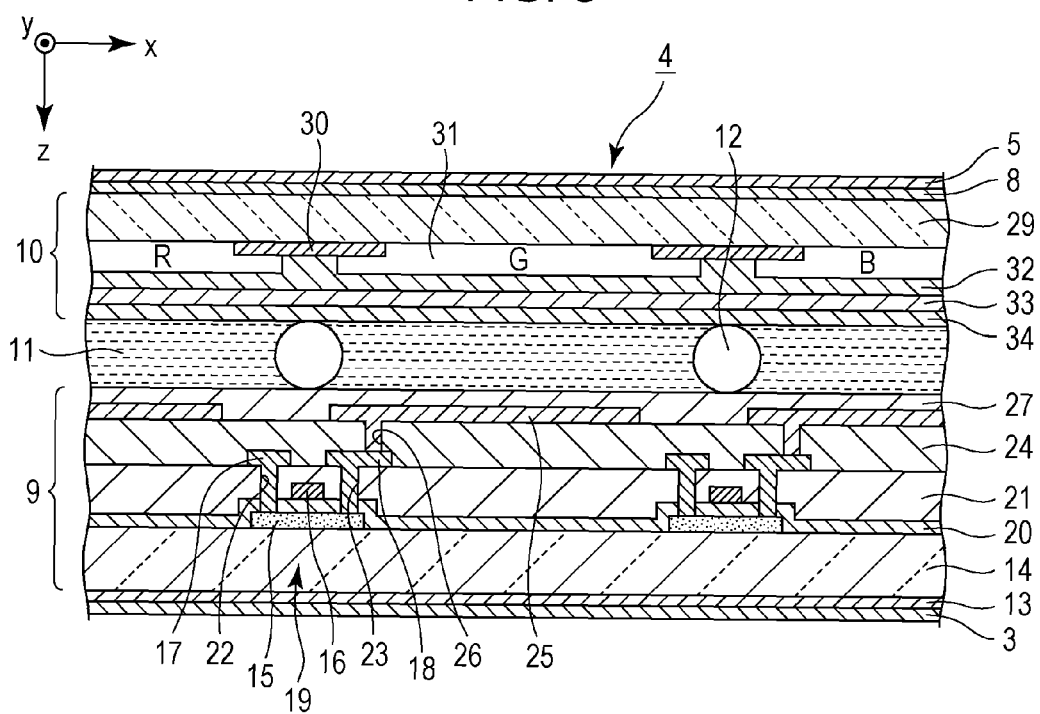
FIG. 3 is a cross-sectional view illustrating a liquid crystal panel which is used in the liquid crystal display device according to the first embodiment.

FIG. 3 is a vertical cross-sectional view of the liquid crystal panel 4.

As illustrated in FIG. 3, the liquid crystal panel 4 includes a TFT substrate 9, a color filter substrate 10, and a liquid crystal layer 11. The TFT substrate 9 is provided in the liquid crystal panel 4 as a switching element substrate. The color filter substrate 10 is arranged so as to face the TFT substrate 9. The liquid crystal layer 11 is interposed between the TFT substrate 9 and the color filter substrate 10. The liquid crystal layer 11 is sealed in a space which is surrounded with the TFT substrate 9, the color filter substrate 10, and a frame shaped sealing member (not shown) which bonds the TFT substrate 9 and the color filter substrate 10 with a certain gap therebetween. The liquid crystal panel 4 according to the embodiment performs a display, for example, in a twisted nematic (TN) mode. In the liquid crystal layer 11, liquid crystals having positive dielectric anisotropy are used. A spherical spacer 12 for maintaining a constant gap between substrates is arranged between the TFT substrate 9 and the color filter substrate 10.

A display mode of the liquid crystal display device according to the embodiment is not limited to the TN mode, and it is possible to use a vertical alignment (VA) mode, a super twisted nematic (STN) mode, an in-plane switching (IPS) mode, a fringe field switching (FFS) mode, or the like, which will be exemplified in the following embodiments.

However, in this embodiment, an example in which the liquid crystal panel of the TN mode is used will be described.

A plurality of pixels (not shown), which are a minimum unit region for display, are arranged in a matrix on the TFT substrate 9. On the TFT substrate 9, a plurality of source bus lines (not shown) are formed so as to extend in parallel to each other, and a plurality of gate bus lines (not shown) are formed so as to extend in parallel to each other, and be orthogonal to the plurality of source bus lines. Accordingly, the plurality of source bus lines and the plurality of gate bus lines are formed in a lattice shape on the TFT substrate 9, and a rectangular region which is partitioned by neighboring source bus lines and neighboring gate bus lines becomes one pixel. The source bus line is connected to a source electrode of a TFT which will be described later, and the gate bus line is connected to a gate electrode of the TFT.

A TFT 19 which includes a semiconductor layer 15, a gate electrode 16, a source electrode 17, a drain electrode 18, and the like, is formed on a surface on the liquid crystal layer 11 side of a transparent substrate 14 which configures the TFT substrate 9. It is possible to use, for example, a glass substrate for the transparent substrate 14. The semiconductor layer 15 which is formed of a semiconductor material, such as continuous grain silicon (CGS), low-temperature poly-silicon (LPS), and amorphous silicon (α-Si), for example, is formed on the transparent substrate 14. In addition, a gate insulating film 20 which covers the semiconductor layer 15 is formed on the transparent substrate 14. As a material of the gate insulating film 20, for example, a silicon oxide film, a silicon nitride film, or a stacked film of these, or the like, is used.

The gate electrode 16 is formed on the gate insulating film 20 so as to face the semiconductor layer 15. As a material of the gate electrode 16, for example, a stacked film of tungsten (W) and tantalum nitride (TaN), molybdenum (Mo), titanium (Ti), aluminum (Al), or the like, is used.

A first insulating interlayer 21 is formed so as to cover the gate electrode 16 on the gate insulating film 20. As a material of the first insulating interlayer 21, for example, a silicon oxide film, a silicon nitride film, or a stacked film of these, or the like, is used. The source electrode 17 and the drain electrode 18 are formed on the first insulating interlayer 21. The source electrode 17 is connected to a source region of the semiconductor layer 15 through a contact hole 22 which passes through the first insulating interlayer 21 and the gate insulating film 20. Similarly, the drain electrode 18 is connected to a drain region of the semiconductor layer 15 through a contact hole 23 which passes through the first insulating interlayer 21 and the gate insulating film 20. As a material of the source electrode 17 and the drain electrode 18, the same conductive material as that of the gate electrode 16, which is described above, is used. A second insulating interlayer 24 is formed so as to cover the source electrode 17 and the drain electrode 18 on the first insulating interlayer 21. As a material of the second insulating interlayer 24, the same material as that of the first insulating interlayer 21 which is described above, or an organic insulating material is used.

The pixel electrode 25 is formed on the second insulating interlayer 24. The pixel electrode 25 is connected to the drain electrode 18 through a contact hole 26 which passes through the second insulating interlayer 24. Accordingly, the pixel electrode 25 is connected to a drain region of the semiconductor layer 15 through the drain electrode 18 as a relay electrode. As a material of the pixel electrode 25, for example, a transparent conductive material such as indium tin oxide (ITO), indium zinc oxide (IZO), or the like, is used. With this configuration, a scanning signal is supplied through a gate bus line, and when the TFT 19 is in an ON state, an image signal which is supplied to the source electrode 17 through a source bus line is supplied to the pixel electrode 25 through the semiconductor layer 15 and the drain electrode 18. In addition, an alignment film 27 is formed on the entire surface of the second insulating interlayer 24 so as to cover the pixel electrode 25. The alignment film 27 has an alignment regulating force which causes liquid crystal molecules which configure the liquid crystal layer 11 to align horizontally. In addition, a form of the TFT may be a bottom gate TFT which is illustrated in FIG. 3, or a top gate TFT.

On the other hand, a black matrix 30, a color filter 31, a planarization layer 32, a counter electrode 33, and an alignment film 34 are sequentially formed on a face on the liquid crystal layer 11 side of a transparent substrate 29 which configures the color filter substrate 10. The black matrix 30 has a function of cutting off transmission of light in a region between pixels. The black matrix 30 is formed using a metal such as chromium (Cr) or a multilayer film of chromium and chromium oxide, or a photoresist in which carbon particles are dispersed in a photosensitive resin. A coloring material of each color of red (R), green (G), and blue (B) is included in the color filter 31. Any one color filter 31 of R, G, and B is arranged so as to face one pixel electrode 25 on the TFT substrate 9. The planarization layer 32 includes an insulating film which covers the black matrix 30 and the color filter 31. The planarization layer 32 has a function of reducing and planarizing a level difference which is generated due to the black matrix 30 and the color filter 31. The counter electrode 33 is formed on the planarization layer 32. As a material of the counter electrode 33, the same transparent conductive material as that of the pixel electrode 25 is used. In addition, the alignment film 34 which has a regulating force for horizontal aligning is formed on the entire surface of the counter electrode 33. The color filter 31 may have a multicolor configuration of more than three colors of R, G, and B.

Figure 2:
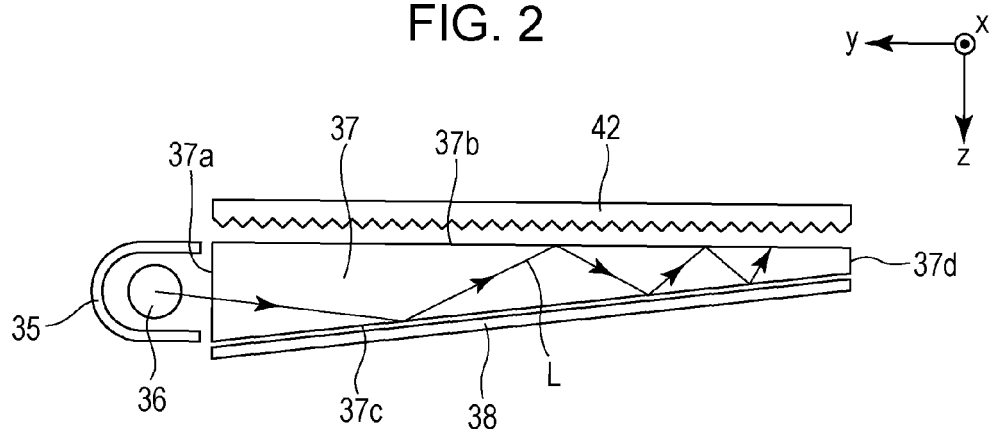
FIG. 2 is a cross-sectional view of a backlight which is used in the liquid crystal display device according to the first embodiment.

As illustrated in FIG. 2, the backlight 2 includes a light source 36 such as a light emitting diode or a cold cathode tube, a light guide 37 which is formed of an acrylic resin, or the like, a reflector 35, a reflecting sheet 38, and a prism sheet 42. The light source 36 is arranged on one end face 37a of the light guide 37 of which the shape in plan view is a rectangular shape, and outputs light toward the end face 37a of the light guide 37. The light guide 37 propagates, inside thereof, light input from the end face 37a and outputs the light from a front face 37b. The reflector 35 reflects light which is output in directions except the direction of the end face 37a of the light guide 37, among light beams which are output from the light source 36, toward the end face 37a of the light guide 37. The reflecting sheet 38 reflects light which is output from a rear face 37c of the light guide 37, and re-inputs the light from the rear face 37c of the light guide 37. The prism sheet 42 includes a plurality of trigonal prism structures 42a which are arranged in parallel to each other. When light is input from the front face 37b of the light guide 37, the prism sheet 42 outputs the light by changing a travelling direction of the light to a direction which is close to a direction normal to the liquid crystal panel 4. The backlight 2 according to the embodiment is an edge-lit backlight in which the light source 36 is arranged on the end face 37a of the light guide 37.

The backlight 2 according to the embodiment is a so-called directive backlight which has directivity by controlling an output direction of light. Specifically, the thickness of the light guide 37 becomes gradually thinner toward the end face 37d on the opposite side from the end face 37a on which the light source 36 is arranged. That is, the front face 37b and the rear face 37c of the light guide 37 are not parallel to each other, and a shape of the light guide 37 which is diagonally viewed is a wedge shape. Light which is input from the end face 37a of the light guide 37 proceeds inside the light guide 37 in the y axis direction, while being repeatedly reflected between the front face 37b and the rear face 37c of the light guide 37. When it is assumed that light guiding plates are parallel plates, an input angle of light with respect to the front face and the rear face of the light guiding plates is constant, even if light is repeatedly reflected several times. In contrast to this, when the light guide 37 has a wedge shape as in the embodiment, an input angle becomes smaller every time light is reflected on the front face 37b and the rear face 37c of the light guide 37.

At this time, when it is assumed that a refractive index of the acrylic resin which configures the light guide 37 is 1.5, and refractive index of air is 1.0, a critical angle of the light guide 37 on the front face 37b, that is, a critical angle in an interface between the acrylic resin which configures the light guide 37 and air becomes approximately 42° from Snell's law. When light immediately after being input to the light guide 37 is input to the front face 37b, since a total reflection condition is satisfied when an input angle of light L to the front face 37b is larger than the critical angle 42°, the light L is totally reflected on the front face 37b. Thereafter, the light L is totally reflected between the front face 37b and the rear face 37c repeatedly, and at a point of time when the input angle of the light L with respect to the front face 37b becomes smaller than the critical angle 42° the light L does not satisfy the total reflection condition and the light L is output to the outer space. Accordingly, the light L is output with an approximately constant output angle with respect to the front face 37b of the light guide 37. In this manner, the backlight 2 has a narrow light distribution in a yz plane, and has directivity in the yz plane. On the other hand, the backlight 2 has a wider light distribution in an xz plane than that in the yz plane, and has no directivity in the xz plane.

The first polarizing plate 3 which functions as a polarizer is provided between the backlight 2 and the liquid crystal panel 4. Here, when denoting an angle counterclockwise, based on a forward direction in the x axis direction, a transmission axis P1 of the first polarizing plate 3 is set to a direction of 135° to 315°. The second polarizing plate 5 which functions as an analyzer is provided between the liquid crystal panel 4 and the light control film 7. A transmission axis P2 of the second polarizing plate 5 is arranged so as to be orthogonal to the transmission axis P1 of the first polarizing plate 3, and is set to a direction of 45° to 225°. The transmission axis P1 of the first polarizing plate 3 and the transmission axis P2 of the second polarizing plate 5 are in a crossed Nicols arrangement.

Subsequently, the light control film 7 will be described in detail.

Figure 5:
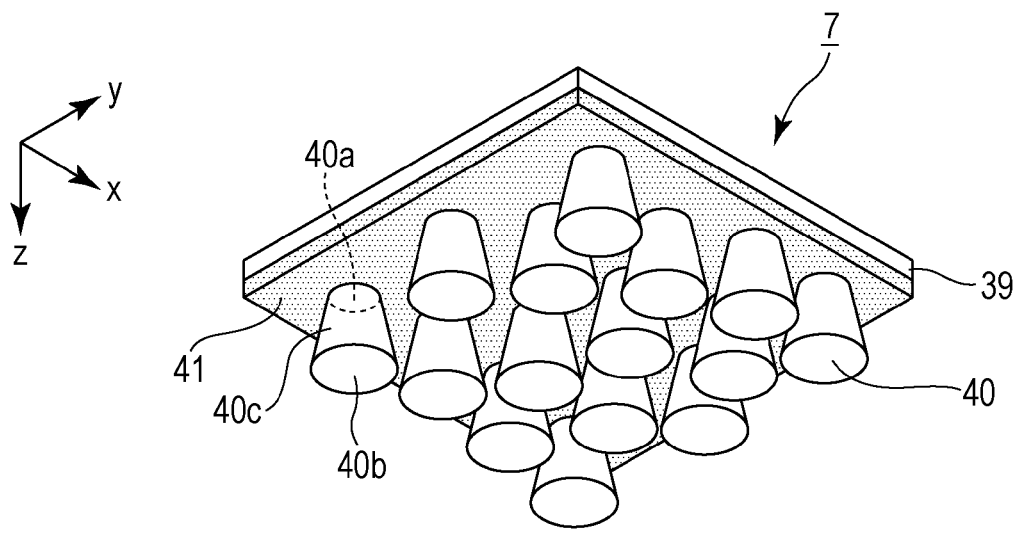
FIG. 5 is a perspective view illustrating a light control film which is used in the liquid crystal display device according to the first embodiment.

FIG. 5 is a perspective view of the light control film 7 which is viewed from the backlight direction.

As illustrated in FIG. 5, the light control film 7 includes a base 39, a plurality of light diffusion units 40 which are formed on one face (face opposite to view side) of the base 39, and a light shielding layer 41 (light shielding unit) which is formed on one face of the base 39. The light control film 7 is arranged on the second polarizing plate 5 by directing the side on which the light diffusion unit 40 is provided toward the second polarizing plate 5, and directing the base 39 side toward the view side. The light control film 7 is fixed onto the second polarizing plate 5 through an adhesive layer (not shown).

As the base 39, for example, a base of a transparent resin such as a triacetylcellulose (TAC) film, polyethylene-telephthalate (PET), polycarbonate (PC), polyethylene-naphthalte (PEN), and polyether sulfone (PES) films are preferably used. The base 39 is a foundation when applying a material of the light shielding layer 41 or light diffusion unit 40 later in a manufacturing process, and is required to have a heat resisting property in a heat treatment process in the manufacturing process, and a mechanical strength. Accordingly, for the base 39, a glass base or the like may be used, in addition to the resin base. However, it is preferable that the thickness of the base 39 be thin to a degree not to deteriorate the heat resisting property or the mechanical strength. The reason is that there is a concern that a blurry display may occur when the thickness of the base 39 is larger. In addition, it is preferable that a total light transmittance of the base 39 be equal to or greater than 90% in accordance with JIS K7361-1. When the total light transmittance is equal to or greater than 90%, it is possible to obtain sufficient transparency. According to the embodiment, a base of a transparent resin of which the thickness is 100 μm is used as an example.

The light diffusion unit 40 is made of an organic material having light permeability and photosensitivity such as an acrylic resin or an epoxy resin, for example. In addition, it is preferable that a total light transmittance of the light diffusion unit 40 be equal to or greater than 90% in accordance with JIS K7361-1. When the total light transmittance is equal to or greater than 90%, it is possible to obtain sufficient transparency. The light diffusion unit 40 has a horizontal section (xy section) with a circular shape, in which an area of a face 40a on the base 39 side as a light output end face is small, an area of a face 40b on a side opposite to the base 39 as a light input end face is large, and an area in the horizontal section becomes gradually larger from the base 39 side toward the side opposite to the base 39. That is, the light diffusion unit 40 has a so-called truncated cone shape which is inversely tapered, when viewed from the base 39 side.

The light diffusion unit 40 is a portion which contributes to transmission of light in the light control film 7. That is, light which is input to the light diffusion unit 40 is guided in a state of approximately being confined within the light diffusion unit 40 while performing total reflection on a tapered side face 40c of the light diffusion unit 40, and is output. A plurality of light diffusion units 40 are arranged at random when viewed from a direction normal to a main surface of the base 39.

Since the light control film 7 is arranged so that the base 39 faces the view side, with respect to two opposing faces of the truncated conical light diffusion unit 40, a face of which an area is small is a light output end face 40a, and a face of which an area is large is a light input end face 40b. In addition, an inclined angle of the side face 40c of the light diffusion unit 40 (angle between the light output end face 40a and side face 40c) is approximately 80°, for example. However, the inclined angle of the side face 40c of the light diffusion unit 40 is not particularly limited, as long as input light can be sufficiently diffused with the inclined angle when being output from the light control film 7.

The light shielding layer 41 is formed in a region except a region where the plurality of light diffusion units 40 are formed, on a surface of the base 39 where the light diffusion units 40 are formed. The light shielding layer 41 is made of an organic material having a light absorption property and photosensitivity such as a black resist, or black ink, for example. In addition, a metal film such as chromium (Cr), or a multilayer film of chromium and chromium oxide may be used. The thickness of the light shielding layer 41 is set to be smaller than the height of the light diffusion unit 40 from the light output end face 40*b* to the light input end face 40*a*. According to the embodiment, the thickness of the light shielding layer 41 is approximately 150 nm, for example, and the height from the light input end face 40*b* to the light output end face 40*a* of the light diffusion unit 40 is approximately 25 μm, for example. In a gap between the plurality of light diffusion units 40, the light shielding layer 41 is present at a portion which comes into contact with one face of the base 39, and air 43 is present in portions other than that.

In addition, it is desirable that the refractive index of the base 39 and the refractive index of the light diffusion unit 40 be approximately the same. The reason is that, for example, when there is a big difference between the refractive index of the base 39 and the refractive index of the light diffusion unit 40, there is a concern that a phenomenon in which a desired view angle is not obtained, a light intensity of output light is reduced, or the like, may occur due to occurrence of refraction or reflection of light which is unnecessary on an interface between the light diffusion unit 40 and the base 39, when light which is input from the light input end face 40*b* is going to be output from the light diffusion unit 40.

According to the embodiment, air 43 is interposed between neighboring light diffusion units 40. Accordingly, when the light diffusion unit 40 is formed using a transparent acrylic resin, for example, the side face 40*c* of the light diffusion unit 40 becomes an interface between the transparent acrylic resin and air 43. Here, surroundings of the light diffusion unit 40 may be filled with another low refractive index material. However, a difference in the refractive index on the interface between the inside and outside of the light diffusion unit 40 becomes maximum when there is air 43 in the outside as compared to a case in which any low refractive index material is present in the outside. Accordingly, in the configuration of the embodiment, a critical angle becomes the smallest angle, and a range of an input angle in which light is totally reflected on the side face 40*c* of the light diffusion unit 40 becomes the largest angle due to the Snell's law. As a result, it is possible to suppress loss of light, and to obtain high luminance.

Figure 6:
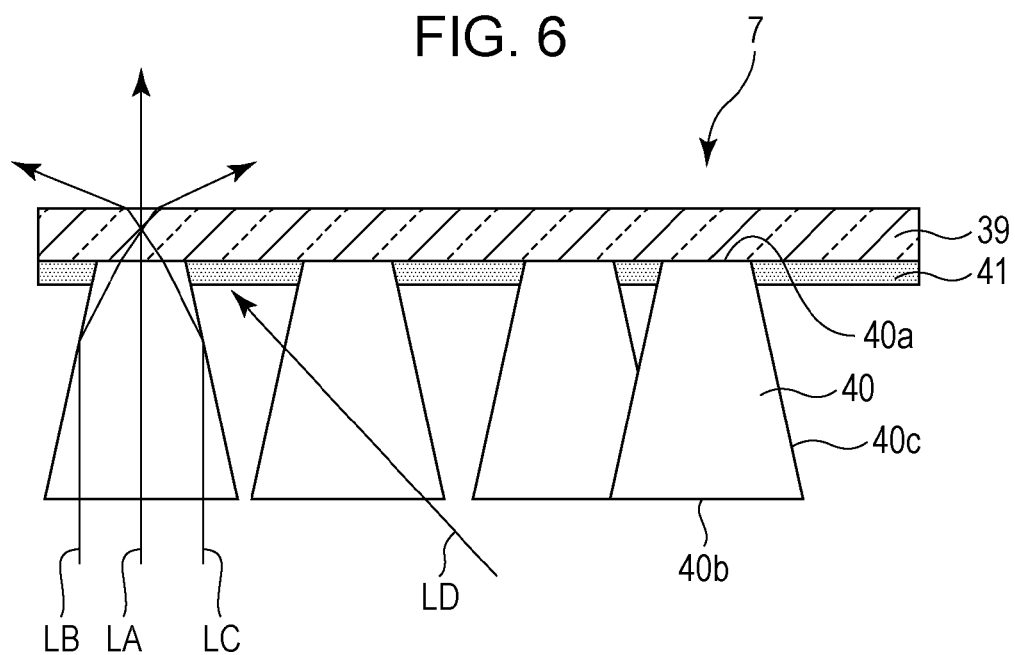
FIG. 6 is a diagram illustrating a behavior of light in the light control film according to the first embodiment.

As illustrated using arrows LB and LC in FIG. 6, input light which is input to the side face 40*c* of the light diffusion unit 40 at an angle exceeding the critical angle is totally reflected on the side face 40*c*, penetrates the light diffusion unit 40, and is output to a viewer side. In addition, as illustrated using an arrow LA in FIG. 6, input light which penetrates the light diffusion unit 40 without being input to the side face 40*c* is output to a viewer side directly. On the other hand, as illustrated using an arrow LD in FIG. 6, input light which is input to the side face 40*c* of the light diffusion unit 40 at an angle which is equal to or smaller than the critical angle is not totally reflected, and penetrates the side face 40*c* of the light diffusion unit 40. At this time, since the light shielding layer 41 is provided in a region except the region where the light diffusion units 40 are formed, light which has penetrated the side face 40*c* of the light diffusion unit 40 is absorbed in the light shielding layer 41. Accordingly, a blurry display does not occur, or contrast is not lowered. However, when light which penetrates the side face 40*c* of the light diffusion unit 40 increases, there is a loss of a light intensity, and an image with high luminance is not obtained. Therefore, it is preferable to use a so-called directional backlight which outputs light at an angle at which light is not input at an angle equal to or smaller than the critical angle to the side face 40*c* of the light diffusion unit 40.

Figure 4A:
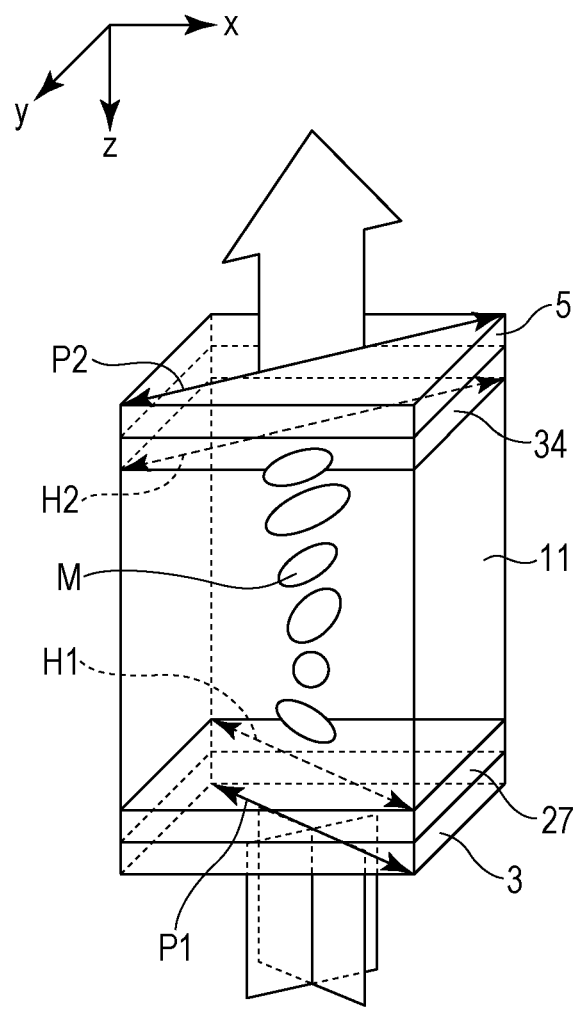
FIG. 4A is a diagram illustrating operations of the liquid crystal display device according to the first embodiment.
Figure 4B:
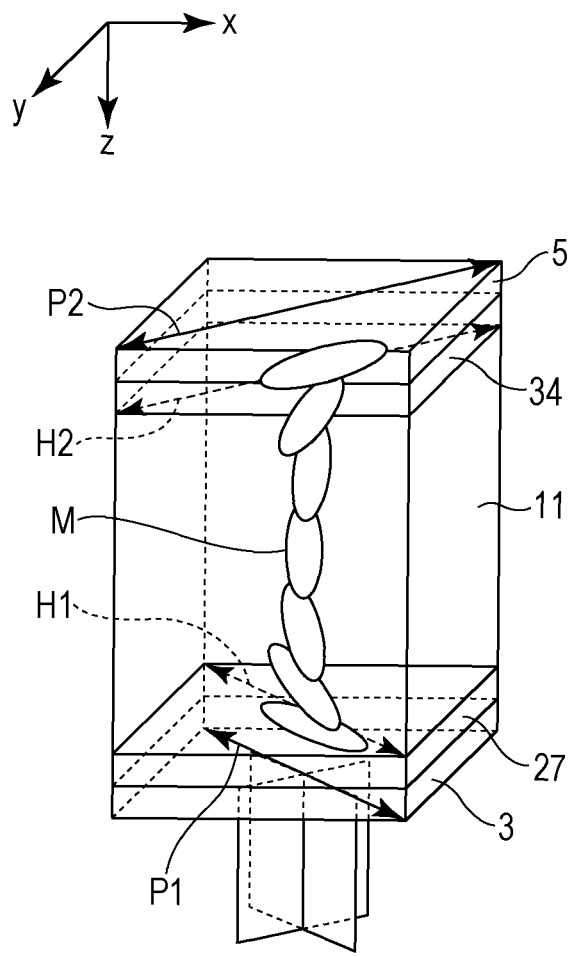
FIG. 4B is a diagram illustrating operations of the liquid crystal display device according to the first embodiment.

Returning to FIG. 3, the alignment film 27 which is provided on the TFT substrate 9 is subject to alignment processing such as rubbing so that an alignment control direction is a direction of 135° to 315°. In FIGS. 4A and 4B, the alignment control direction of the alignment film 27 is denoted by the arrow H1. On the other hand, the alignment film 34 of the color filter substrate 10 is subject to the alignment processing such as rubbing so that an alignment control direction becomes a direction of 45° to 225°. In FIGS. 4A and 4B, the alignment control direction of the alignment film 34 is denoted by the arrow H2.

When a voltage is not applied between the pixel electrode 25 and the counter electrode 33, as illustrated in FIG. 4A, liquid crystal molecules M which configure the liquid crystal layer 11 are in a state twisted by 90° between the two alignment films 27 and 34. At this time, a polarization plane of linear polarized light which has penetrated the first polarizing plate 3 having the transmission axis P1 in the direction of 135° to 315° rotates by 90° due to optical rotation of the liquid crystal layer 11, and the polarized light penetrates the second polarizing plate 5 having the transmission axis P2 in the direction of 45° to 225°. As a result, there is a white display when a voltage is not applied.

When a voltage is applied between the pixel electrode 25 and the counter electrode 33, as illustrated in FIG. 4B, the liquid crystal molecules M which configure the liquid crystal layer 11 are in a state of rising in a direction which goes along an electric field between the two alignment films 27 and 34. At this time, since the polarization plane of the linear polarized light which has penetrated the first polarizing plate 3 having the transmission axis P1 in the direction of 135° to 315° does not rotate, the polarized light does not penetrate the second polarizing plate 5 having the transmission axis P2 in the direction of 45° to 225°. As a result, there is a black display when a voltage is applied. As described above, an image can be displayed by switching between a white display and black display, by controlling application and non-application of a voltage in each pixel.

Meanwhile, as described below, a contrast ratio of a display image is different depending on an observation angle.

Figure 7:
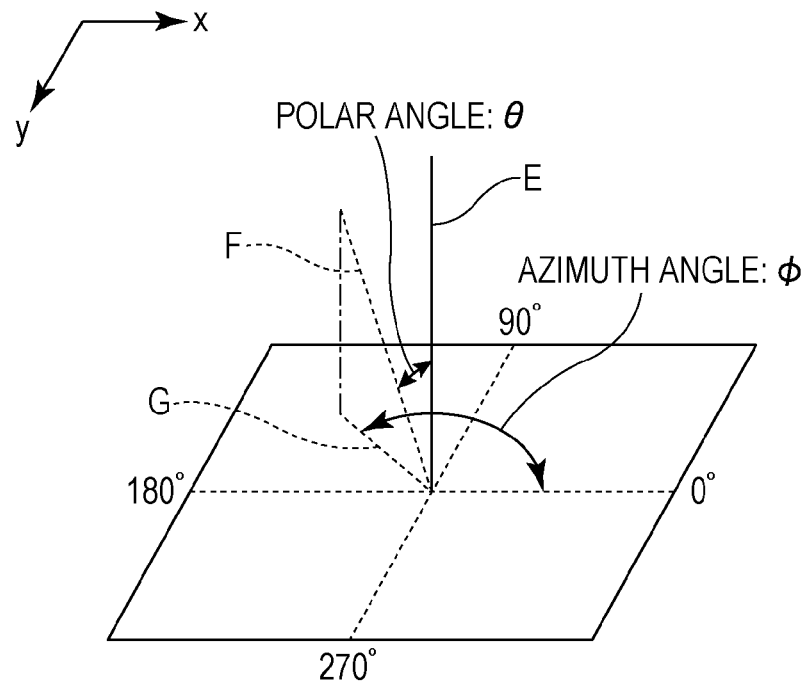
FIG. 7 is a diagram describing definitions of a polar angle and an azimuth angle.

Here, as illustrated in FIG. 7, an angle of a gaze direction F of a viewer which is set based on a direction E normal to a screen of the liquid crystal display device 1 is set to a polar angle θ, and an angle in a direction of a line segment G which is obtained when the gaze direction F of the viewer based on the forward direction (direction of 0°) on the x axis is projected on the screen is set to an azimuth angle φ.

Figure 8A:
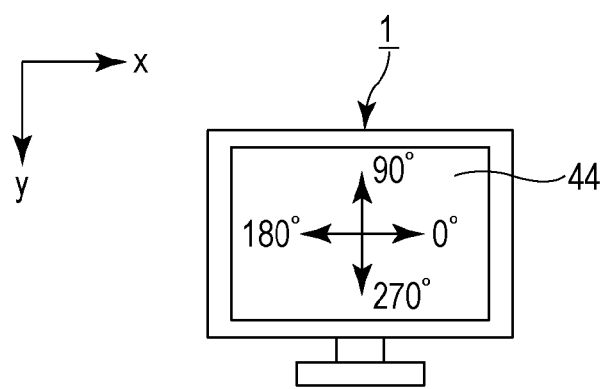
FIG. 8A is a front view of a liquid crystal display device.

As illustrated in FIG. 8A, an azimuth angle φ in the horizontal direction (x axis direction) on the screen of the liquid crystal display device 1 is set to a direction of 0° to 180°, and an azimuth angle φ in the vertical direction (y axis direction) is set to a direction of 90° to 270°. At this time, an iso-contrast curve becomes the curve illustrated in FIG. 8B. Four iso-contrast curves have higher contrast ratios when going toward the inside from the outside, and contrast ratios thereof are 50, 100, 500, and 1000. All of the four iso-contrast curves have rotationally asymmetric shapes, and in particular, an iso-contrast curve with a high contrast ratio has a shape which extends in a direction of an azimuth angle φ of 0° to 180°, and contracts in a direction of an azimuth angle φ of 90° to 270°. In addition, the contrast ratio is a luminance value of a white display/a luminance value of a black display in a display image. When the contrast ratio is high, it is possible to determine that viewability of a display image is good.

Figure 8B:
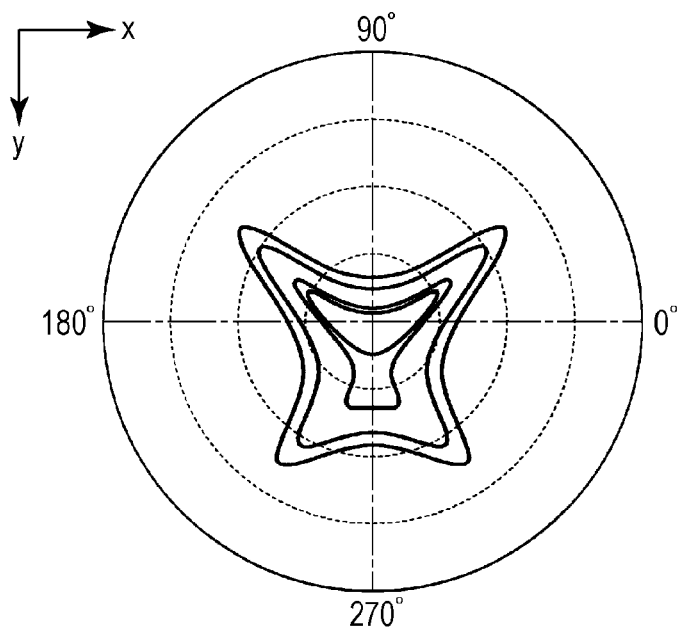
FIG. 8B is a diagram illustrating iso-contrast curves.
Figure 8C:
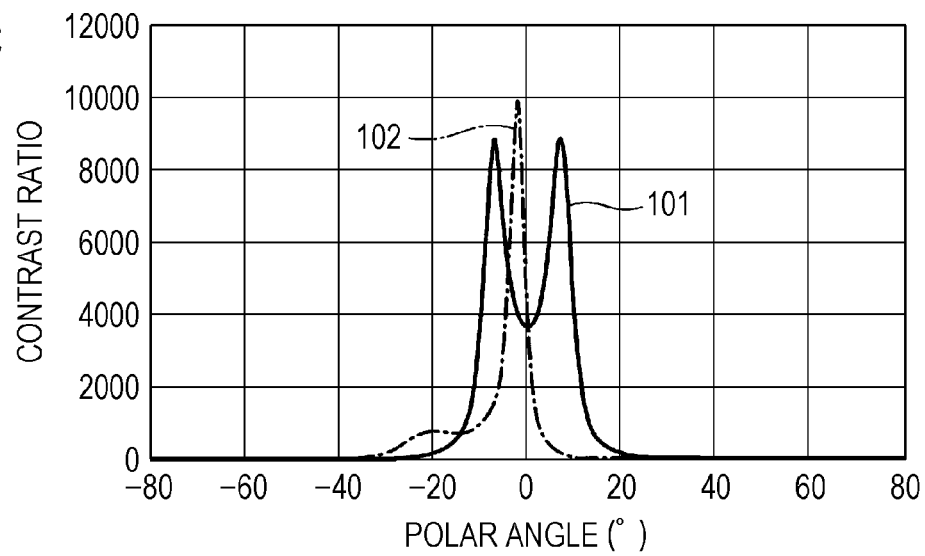
FIG. 8C is a graph illustrating contrast distribution in two directions on a screen.

FIG. 8C illustrates a graph of contrast distribution in the direction of the azimuth angle φ of 0° to 180°, and in the direction of the azimuth angle φ of 90° to 270° in FIG. 8B. The horizontal axis in FIG. 8C denotes a polar angle [°]. The vertical axis in FIG. 8C denotes a contrast ratio. The contrast distribution in the direction of the azimuth angle φ of 0° to 180° is denoted by a solid line 101. The contrast distribution in the direction of the azimuth angle φ of 90° to 270° is denoted by a dot dashed line 102.

As illustrated in FIG. 8C, the contrast distribution in the direction of the azimuth angle φ of 90° to 270° has one peak, and an angle range with a high contrast ratio is relatively narrow. In contrast to this, the contrast distribution in the direction of the azimuth angle φ of 0° to 180° has two peaks, and an angle range with a high contrast ratio is relatively wide. That is, a view angle in the direction of the azimuth angle φ of 90° to 270° is relatively narrow, and a view angle in the direction of the azimuth angle φ of 0° to 180° is relatively wide. In addition, when comparing the direction of the azimuth angle φ of 90° to the azimuth angle φ of 270°, a view angle in the direction of the azimuth angle φ of 90° is relatively narrow, and a view angle in the direction of the azimuth angle φ of 270° is relatively wide.

Figure 9A:
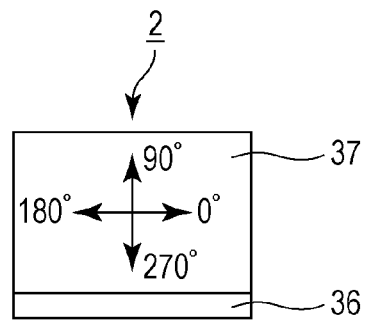
FIG. 9A is a front view of a backlight.
Figure 9B:
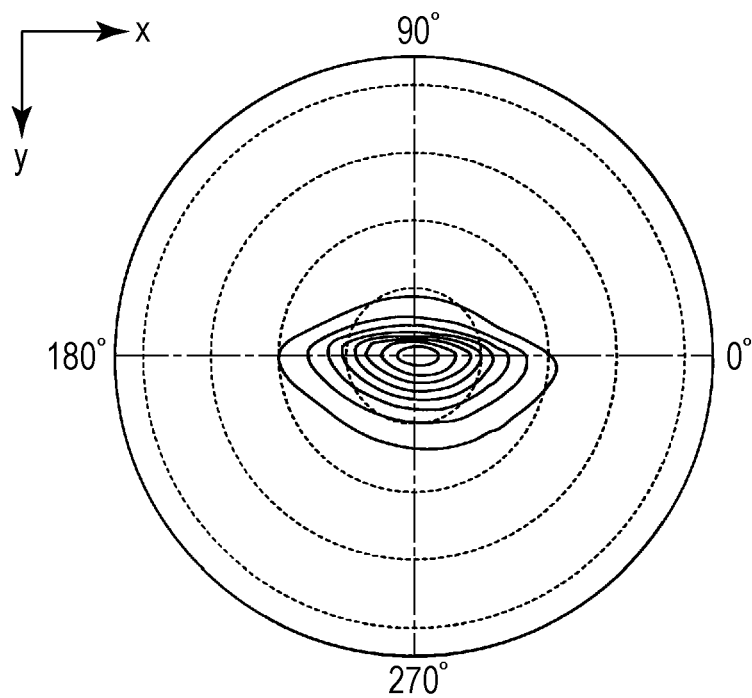
FIG. 9B is a diagram illustrating iso-luminance curves.

As described above, in the backlight 2 according to the embodiment, a light distribution in the yz plane is relatively narrow, and a light distribution in the xz plane is relatively wide. In other words, in the backlight 2, directivity in the yz plane is relatively high, and directivity in the xz plane is relatively low. In FIG. 9B, this is visualized using the azimuth angle φ. That is, FIG. 9B is iso-luminance curves of the backlight 2 according to the embodiment. Eight iso-luminance curves have higher luminance toward the inside from the outside, and luminance thereof is 2,000, 3,000, 4,000, 5,000, 6,000, 7,000, 8,000, and 9,000 [cd/m²], respectively. All of the eight iso-luminance curves have rotationally asymmetric shapes, extend in the direction of the azimuth angle φ of 0° to 180°, and form a contracted shape in the direction of the azimuth angle φ of 90° to 270°. At this time, as illustrated in FIG. 9A, the backlight 2 is arranged so that the light source 36 is located in the direction of the azimuth angle φ of 270°, and the light guide 37 is located in the direction of the azimuth angle φ of 90°.

Figure 9C:
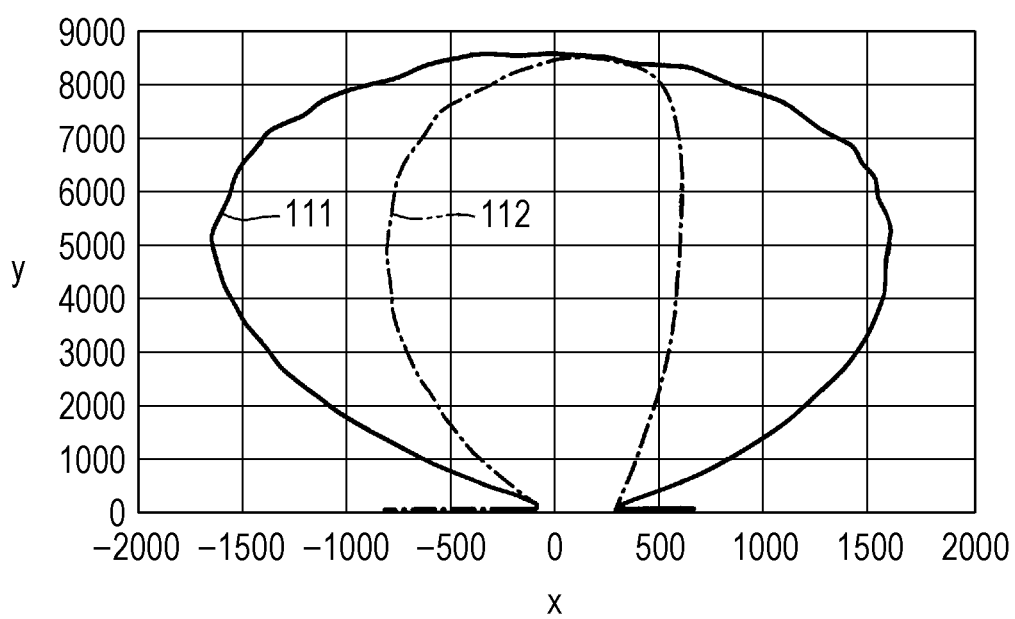
FIG. 9C is a graph illustrating luminance distribution using polar coordinates.

In FIG. 9C, a luminance distribution in the direction of the azimuth angle φ of 0° to 180°, and in the direction of the azimuth angle φ of 90° to 270° are expressed using polar coordinates with respect to the iso-luminance curves in FIG. 9B. The luminance distribution in the direction of the azimuth angle φ of 0° to 180° is denoted by a solid line 111. The luminance distribution in the direction of the azimuth angle φ of 90° to 270° is denoted by a dot dashed line 112. As indicated in FIGS. 9B and 9C, in the direction of the azimuth angle φ of 90° to 270°, an angle range with high luminance is relatively narrow. In contrast to this, in the direction of the azimuth angle φ of 0° to 180°, an angle range with high luminance is relatively wide. That is, an intensity of light which is output in the direction of the azimuth angle φ of 90° to 270° from the backlight 2 is relatively small, and an intensity of light which is output in the direction of the azimuth angle φ of 0° to 180° is relatively large. In addition, when comparing the direction of the azimuth angle φ of 90° to the direction of the azimuth angle φ of 270°, an intensity of light which is output in the direction of the azimuth angle φ of 90° is relatively small, and an intensity of light which is output in the direction of the azimuth angle φ of 270° is relatively large.

In the liquid crystal display device 1 according to the embodiment, the liquid crystal panel 4 and the backlight 2 are arranged so that a direction of the azimuth angle φ of 90° in which a view angle of the liquid crystal panel 4 is the narrowest angle, and a direction of the azimuth angle φ of 90° in which an intensity of light which is output from the backlight 2 is the smallest amount match. With this configuration, there is not much light input from the backlight 2 in the azimuth angle direction in which a view angle of the liquid crystal panel 4 is relatively narrow. As a result, a leak of light in a black display portion is suppressed, and it is possible to suppress grayscale inversion which is caused when the liquid crystal display device 1 is viewed from the diagonal direction.

In addition, since the liquid crystal display device 1 according to the embodiment includes the light control film 7, light which is input to the light control film 7 is output from the light control film 7 in a state in which an angular distribution of the light is widened as compared to a state before being input to the light control film 7. Accordingly, it is possible to view a good display even when a line of sight of a viewer is tilted from the front side direction (direction of the normal) to the liquid crystal display device 1. In particular, according to the embodiment, since a shape of the light diffusion unit 40 in plan view is a circular shape, the angular distribution spreads in all directions about the direction normal to the screen 44 of the liquid crystal display device 1. Accordingly, it is possible for a viewer to view a good display in all directions. That is, it is possible to realize a liquid crystal display device with excellent view angle characteristics using the light control film 7.

In general, in a case in which regular patterns such as stripes, lattices, or the like, overlap with each other, it is known that a fringe interference pattern (moire) is viewed when a cycle of each pattern is slightly shifted. For example, when it is assumed that a light control film on which a plurality of light diffusion units are arranged in a matrix, and a liquid crystal panel on which a plurality of pixels are arranged in a matrix are overlapped with each other, there is a concern that moire may occur between a cyclic pattern of the light diffusion units of the light control film and a cyclic pattern of the pixels of the liquid crystal panel, and a display quality may deteriorate. In contrast to this, in the liquid crystal display device 1 according to the embodiment, since the plurality of light diffusion units 40 are randomly arranged in plan view, it is possible to maintain a display quality without occurrence of moire due to interference with regularly arranged pixels of the liquid crystal panel 4.

In the above described embodiment, the plurality of light diffusion units 40 are randomly arranged, however, the plurality of light diffusion units 40 are not necessarily arranged at random, and as long as the arrangement of the plurality of light diffusion units 40 is non-cyclic, it is possible to suppress occurrence of moire. In addition, when occurrence of slight moire is allowed depending on uses and situations, the plurality of light diffusion units 40 may be arranged cyclically. For example, a configuration of arranging the plurality of light diffusion units 40 in a matrix on the entire surface of the light control film 7 may be adopted.

In addition, according to the embodiment, the direction of the azimuth angle φ of 90° in which the view angle of the liquid crystal panel 4 is the narrowest angle, and the direction of the azimuth angle φ of 90° in which an intensity of light which is output from the backlight 2 is the smallest amount are matched. Instead of this configuration, for example, the backlight 2 may be rotated by 180° about the direction of the normal without changing the direction of the liquid crystal panel 4. That is, the direction of the azimuth angle ϕ of 90° in which the view angle of the liquid crystal panel 4 is the narrowest angle and the direction of the azimuth angle ϕ of 270° in which an intensity of light which is output from the backlight 2 is the second smallest amount to the direction of the azimuth angle ϕ of 90° may be matched. In this case, an effect of improving the view angle characteristics is less than the case in which the direction of the azimuth angle ϕ of 90° of the liquid crystal panel 4 and the direction of the azimuth angle ϕ of 90° of the backlight 2 are matched. However, the view angle characteristics are markedly improved compared to a case in which the direction of the azimuth angle ϕ of 90° of the liquid crystal panel 4 and the direction of the azimuth angle ϕ of 0° or 180° of the backlight 2 are matched.

[First Modification of Light Control Film]

Instead of the light control film which is used in the liquid crystal display device of the embodiment, a light control film which is described below may be used.

Figure 10:
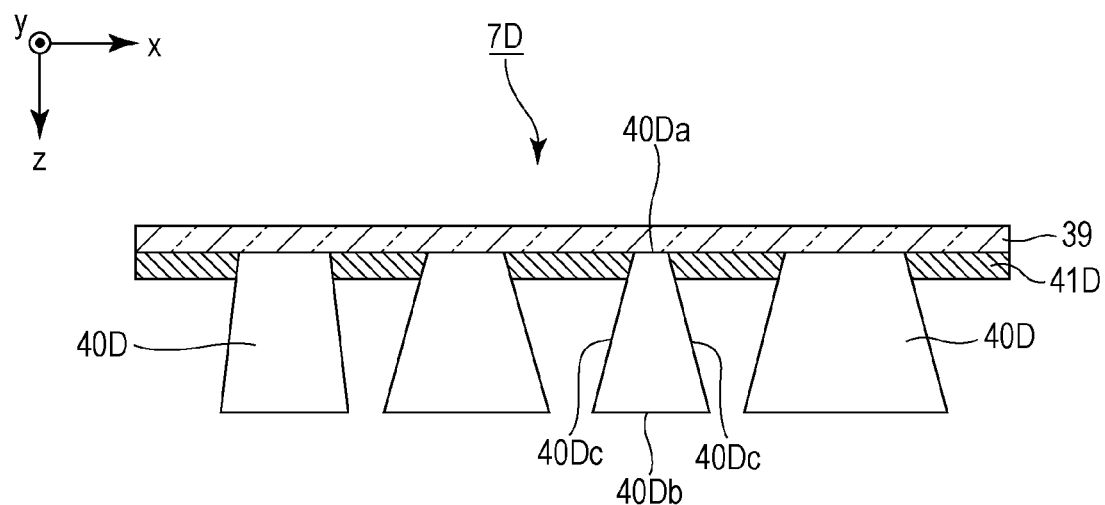
FIG. 10 is a cross-sectional view illustrating a first modification of the light control film.

FIG. 10 is a cross-sectional view illustrating a light control film 7D of a first modification.

In a case of the light control film 7 in the above described embodiment, all of the plurality of light diffusion units 40 have the same shape. In contrast to this, as illustrated in FIG. 10, in the light control film 7D according to the modification, dimensions of light output end faces 40Da (dimensions of opening portion of light shielding layer 41D) are different in a plurality of light diffusion units 40D, and inclined angles of side faces 40Dc are also different from each other. That is, when viewing all of the plurality of light diffusion units 40D, the light output end faces 40Da of the plurality of light diffusion units 40D have a plurality of dimensions, and the side faces 40Dc of the plurality of light diffusion units 40 have a plurality of inclined angles. In addition, since the inclined angles of the side faces 40Dc of the plurality of light diffusion units 40D are different, dimensions of light input end faces 40Db are also different.

As described above, light input to the light diffusion unit 40D is totally reflected on the side face 40Dc of the light diffusion unit 40D, and is output from the light diffusion unit 40D in a state in which an angular distribution thereof is widened compared to a state before being input. Accordingly, an angular distribution of light which is output from the light diffusion units 40D depends on a distribution of inclined angles of the side faces 40Dc of the light diffusion units 40D. Thus, as in the above described embodiment, when it is assumed that the inclined angle of the side face 40c of the light diffusion unit 40 is constant, luminance becomes high at a specific light output angle, and a bright display can be viewed at a specific viewing angle. On the other hand, when a display device is viewed at a different angle, there is a concern that display unevenness may be viewed depending on an observation angle.

In contrast to this, according to the light control film 7D according to the modification, since inclined angles of the side faces 40Dc of the plurality of light diffusion units 40D are different from each other, it is possible to widen ranges of a total reflection angle of light by interpolating the ranges with the plurality of light diffusion units 40D in which the inclined angles of the side faces 40Dc are different from each other. As a result, luminance smoothly changes according to an observation angle when viewing the liquid crystal display device by changing the angle, and it is possible to improve the view angle characteristics.

In addition, when the plurality of light diffusion units are arranged randomly, if light diffusion units with the same size are arranged, portions in which the light diffusion unit cannot be arranged increase due to interference between light diffusion units. In that case, since a ratio of the light diffusion units occupying the light control film becomes small, a ratio of light which is absorbed in the light shielding layer without penetrating the light diffusion unit among light beams which are output from the backlight increases.

As a result, use efficiency of light from the backlight decreases, and front luminance also decreases. Regarding that point, it is possible to increase the ratio of the light diffusion units 40D occupying the light control film 7D in the modification, for example, by filling a gap between large light diffusion units 40D with a small light diffusion unit 40D, or the like. In this manner, it is possible to improve use efficiency of light from the backlight, and to increase front luminance. However, it is also possible to obtain an effect of improving the front luminance simply by making inclined angles on a side face the same, making a size of at least a part of the light diffusion units different from that of other light diffusion units, and by setting at least two sizes.

In addition, according to the modification, since a plurality of sizes are set with respect to the inclined angle of the side faces 40Dc of the light diffusion units 40D, the luminance smoothly changes, which is desirable. However, it is possible to obtain an effect of improving the view angle characteristics simply by making the inclined angle of at least a part of the light diffusion units different, and by setting at least two sizes of the inclined angle.

In addition, the shapes of the light output end face 40Da and the light input end face 40Db of all the light diffusion units 40D in plan view are set to circular shapes, however, the shapes are not necessarily circular shapes. For example, the shape of the light diffusion unit may be an octagonal frustum shape, and both the shapes of the light input end face and the light output end face in plan view may be octagonal shapes. In such a case, since there are four sets of sides which are formed of a pair of sides facing each other in the light diffusion unit, light diffuses by concentrating in the four azimuth angle directions. Accordingly, the effect of increasing the view angle is exhibited in the horizontal direction, vertical direction, and diagonal direction of a screen in which the view angle characteristics are considered to be particularly important in the liquid crystal display device. In addition, the shape of the light diffusion unit in plan view is not limited to the octagonal shape, and other polygonal shapes can be adopted. In such a case, since light is diffused by being concentrated in a specific direction according to the shape of the polygonal shape and the arrangement of the sides, it is possible to provide a liquid crystal display device in which an excellent effect of increasing the view angle is exhibited in a specific viewing direction. In addition, as the shape of the light diffusion unit in plan view, a circular shape, a polygonal shape, and an oval shape may be adopted. In addition, it is possible to obtain the effect of improving the view angle characteristics even when a part of the light diffusion unit is connected to a neighboring light diffusion unit, or a part thereof is omitted.

[Second Modification of Light Control Film]

Figure 11:
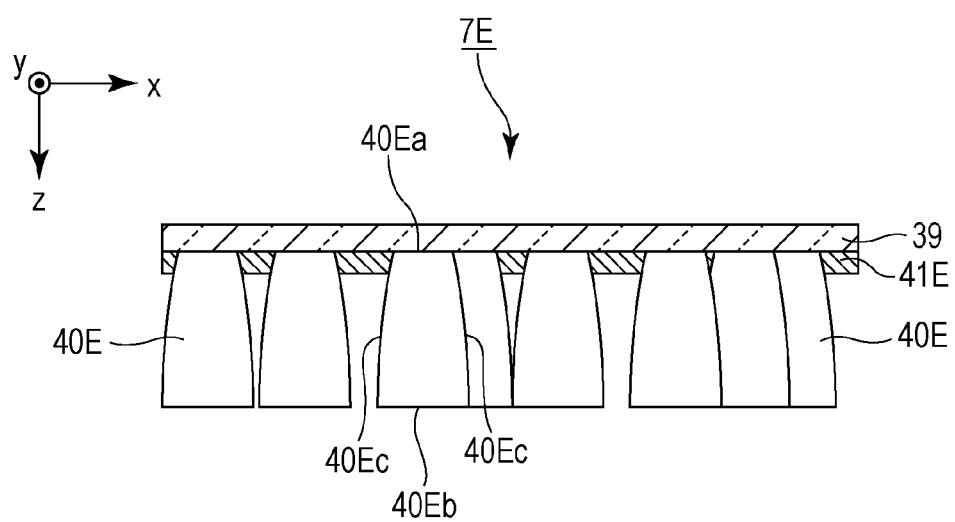
FIG. 11 is a cross-sectional view illustrating a second modification of the light control film.

FIG. 11 is a cross-sectional view illustrating a light control film 7E in a second modification.

In the above described embodiment, the side face of the light diffusion unit has a constant inclined angle when attention is paid to one light diffusion unit. In contrast to this, as illustrated in FIG. 11, in the light control film 7E according to the modification, a side face 40Ec of each light diffusion unit 40E is smoothly curved in a convex shape from a light output end face 40Ea to a light input end face 40Eb, and inclined angles are different depending on locations. That is, the inclined angle of the side face 40Ec of the light diffusion unit 40E changes from the light output end face 40Ea to the light input end face 40Eb.

When the inclined angle on the side face of the light diffusion unit is constant, there is a case in which display unevenness is visually confirmed depending on an observation angle when the observation angle is changed along the horizontal direction or vertical direction of a screen. As a countermeasure for the display unevenness, the plurality of light diffusion units 40D as a whole have the side faces of the plurality of inclined angles in the light control film 7D in the first modification. In contrast to this, in the light control film 7E in the modification, a different inclined angle is set depending on a location of the side face 40Ec even in each individual light diffusion unit 40E. Accordingly, a reflection angular distribution of light is widened as compared to a case in which the inclined angle on the side face is constant. Therefore, luminance smoothly changes according to an observation angle, and it is possible to improve view angle characteristics.

[Third Modification of Light Control Film]

Figure 12:
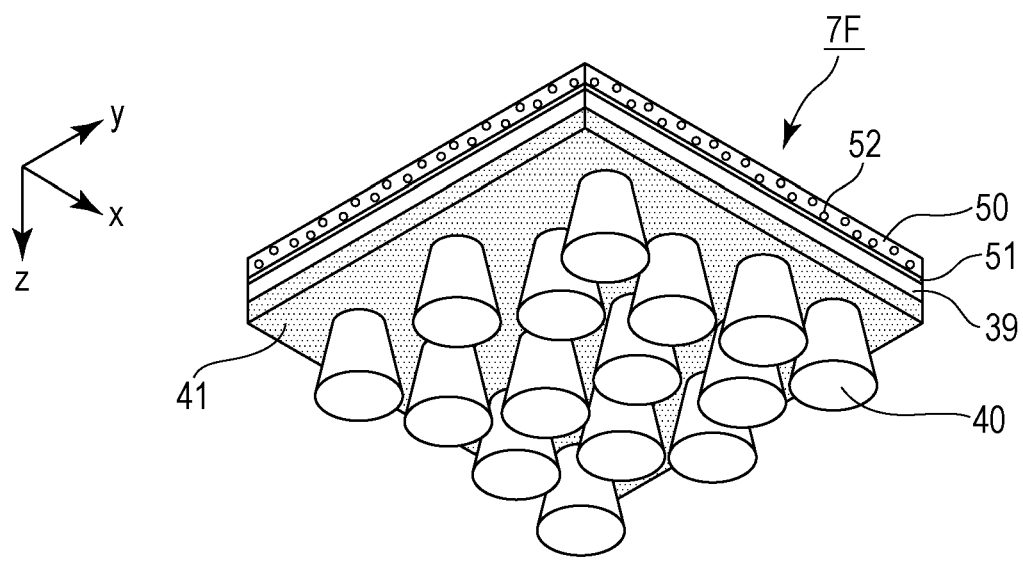
FIG. 12 is a perspective view illustrating a third modification of the light control film.
Figure 13A:
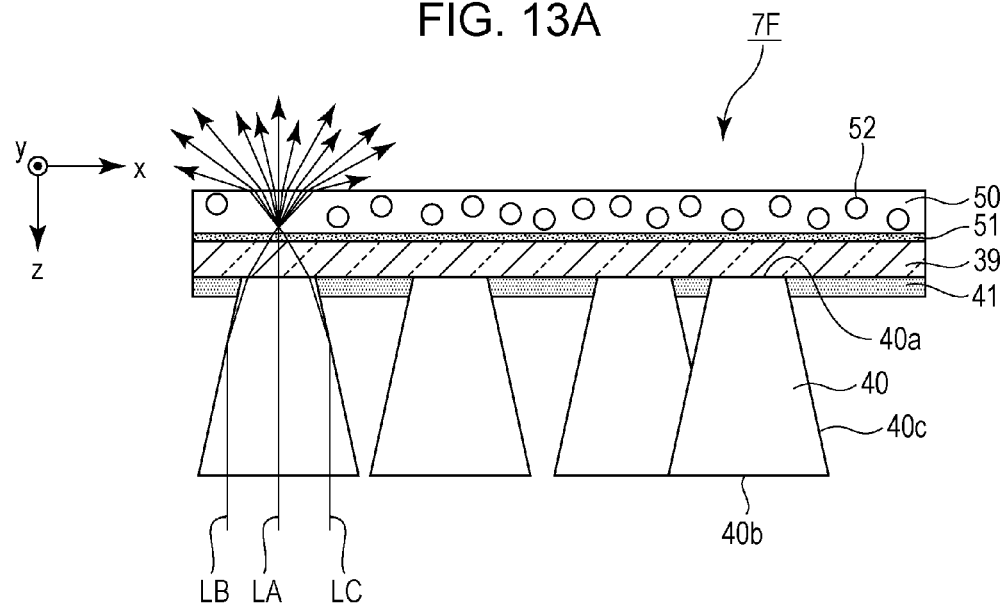
FIG. 13A is a diagram illustrating a behavior of light in the light control film according to the third modification.
Figure 13B:
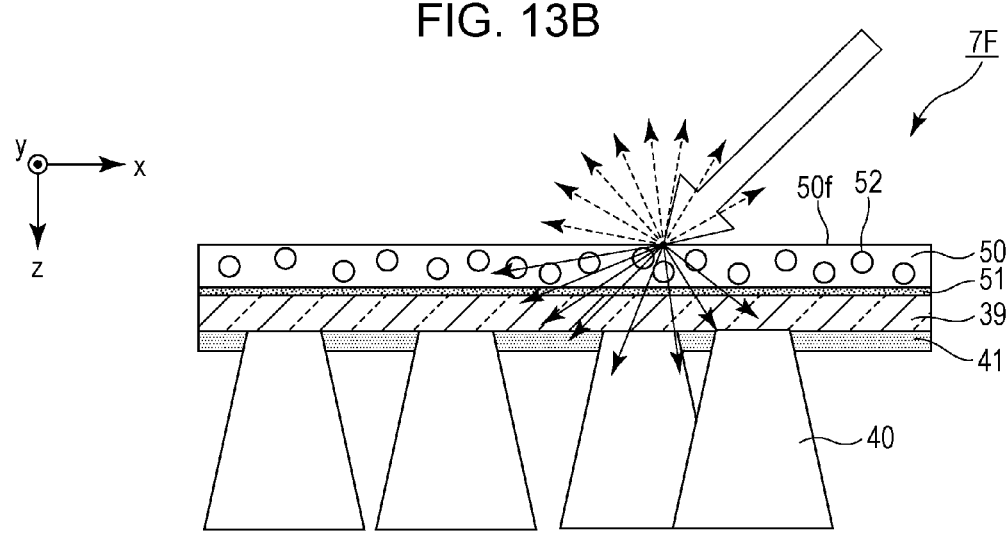
FIG. 13B is a diagram illustrating a behavior of light in the light control film according to the third modification.

FIG. 12 is a perspective view illustrating a light control film 7F in a third modification. FIGS. 13A and 13B are diagrams which describe operations of the light control film 7F according to the modification.

In the light control film 7F according to the modification, as illustrated in FIG. 12, in addition to the light control film 7 in the above described embodiment, a light diffusion film 50 (light scattering layer) is fixed using an adhesive layer 51 on the face on a viewing side of the base 39. The light diffusion film 50 is a film in which light scatterers 52 such as a large number of acrylic beads are dispersed inside a binder resin such as an acrylic resin, for example. The thickness of the light diffusion film 50 is approximately 20 μm, for example. A spherical diameter of the spherical light scatterers 52 is approximately 0.5 μm to 20 μm, for example. The thickness of the adhesive layer 51 is approximately 25 μm, for example. The light diffusion film 50 functions as an isotropic diffusion material. That is, the light diffusion film 50 isotropically diffuses light of which an output angle is controlled in the light diffusion unit 40 of the light control film 7, and has a function of spreading the light in a wide angle.

The light scatterers 52 are not limited to the acrylic beads, and may be made of a transparent substance such as resin pieces formed of an acrylic polymer, olefin-based polymer, a vinyl polymer, a cellulose polymer, an amide-based polymer, a fluorine-based polymer, an urethane-based polymer, a silicone-based polymer, or an imide-based polymer, or such as glass beads. In addition, it is possible to use a scatterer or a reflector which does not absorb light, in addition to those transparent substances. Alternatively, the light scatterers 52 may be air bubbles diffused in the light diffusion unit 40. It is possible to form individual shapes of the light scatterers 52 in various shapes such as a spherical shape, an oval shape, a plate shape, and a polygonal cube, for example. A size of the light scatterers 52 may be formed uniformly, or non-uniformly.

According to the modification, the light diffusion film 50 also functions as an antiglare treatment layer (antiglare layer). The antiglare treatment layer can be formed by performing a sandblast treatment, embossing processing, or the like, on the base 39, for example. However, according to the modification, the antiglare treatment is performed by forming a layer including the plurality of light scatterers 52 on the base 39. According to the configuration, it is not necessary to further provide the antiglare treatment layer, since the light diffusion film 50 functions as the antiglare treatment layer. Due to this, it is possible to make the device simple and thin.

In addition, according to the modification, the light diffusion film 50 is arranged outside the adhesive layer 51, however, the configuration is not limited thereto. For example, the adhesive layer 51 itself may have a light diffusing property. The configuration can be realized, for example, by diffusing the plurality of light scatterers in the adhesive layer 51. As the adhesive layer 51, it is possible to use an adhesive substance suitable for an adhesion target such as an adhesive of rubber, acrylic, silicone, vinyl alkyl ether, polyvinyl alcohol, polyvinylpyrrolidone, polyacrylamide, and cellulose. In particular, an adhesive substance which has excellent transparency or weatherability is preferably used. It is preferable that the adhesive layer 51 be protected using a separator, or the like, until being used.

As illustrated in FIG. 13A, in the light control film 7F according to the modification, the light diffusion film 50 is arranged on the uppermost surface of the light control film 7F. Accordingly, output angles of light beams LA, LB, and LC which are input to the light input end face 40*b* of the light diffusion unit 40 are controlled by the light diffusion unit 40, and then, the light beams are isotropically diffused by the light diffusion film 50. As a result, light beams with various angles are output from the light diffusion film 50.

In addition, as illustrated in FIG. 13B, in the light control film 7F, the light diffusion film 50 is configured so that light which is input from a face 50*f* on the side opposite to the light diffusion unit 40 of the light diffusion film 50, and is reflected on an interface between the base such as a binder resin and the light scatterers 52, or is refracted by the light scatterers 52, and of which a travelling direction is changed is scattered forward. In addition, in FIG. 13B, the light scattered forward is denoted by a solid arrow. For comparison, light scattered backward is denoted by a dashed arrow, however, the light diffusion film 50 is configured so that this type of light is not generated. Such a total reflection condition can be satisfied by appropriately changing a size of a particle of the light scatterers 52 which are included in the light diffusion film 50, for example.

In this manner, in a case of the light control film 7F according to the modification, since the light diffusion film 50 is arranged on the uppermost surface of the light control film 7F, it is possible to prevent a diffusion angle of light from being concentrated in a certain direction. As a result, it is possible to make a light diffusing property of the light control film 7F smoother, and to obtain a bright display due to a wide view angle.

[Fourth Modification of Light Control Film]

Figure 14:
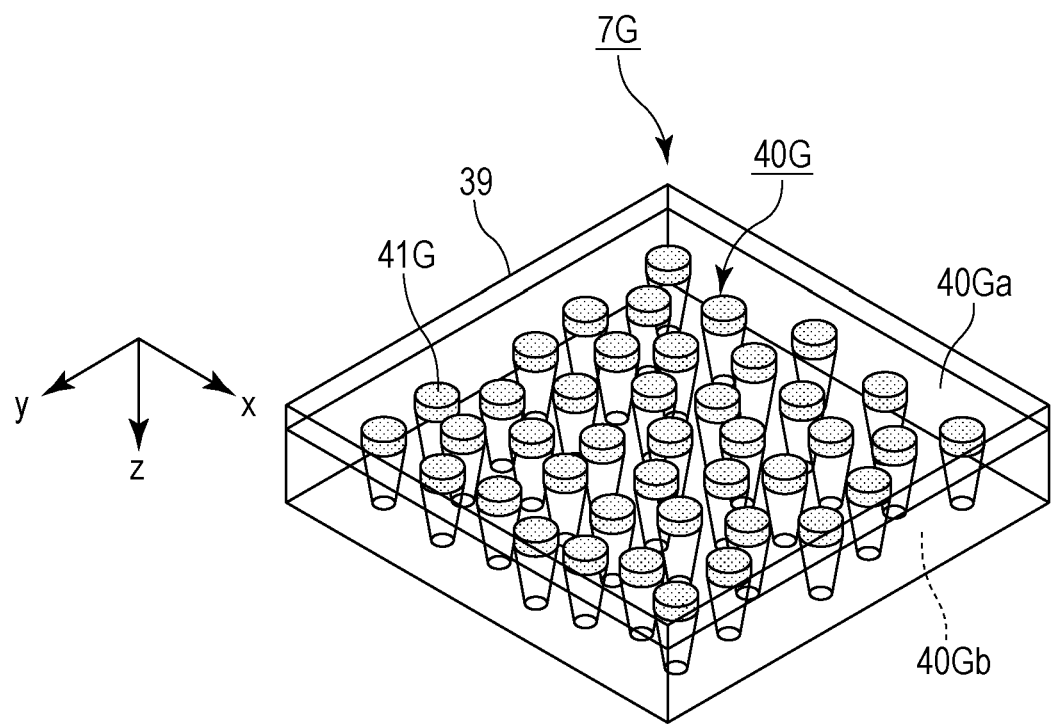
FIG. 14 is a perspective view illustrating a fourth modification of the light control film.

FIG. 14 is a perspective view illustrating a light control film 7G according to a fourth modification.

In the light control film of the above described embodiment and each modification, a plurality of light diffusion units are scattered on the base. In contrast to this, as illustrated in FIG. 14, in the light control film 7G of the modification, a plurality of light shielding units 41G are arranged by being scattered on one face of the base 39, and the entire region except the region in which the plurality of light shielding units 41G are formed is one light diffusion unit 40G. The light control film is the same as that in the above described embodiment and each modification in points that a light output end face 40Ga is provided on the base 39 side, a light input end face 40Gb of which an area is larger than that of the light output end face 40Ga is provided on the side opposite to the base 39, the height of the light diffusion unit 40G from the light input end face 40Gb to the light output end face 40Ga is larger than the height of the light shielding unit 41G, and air is present in a gap around the light diffusion unit 40G. In the light control film 7G of the modification, the gap in the light diffusion unit 40G has a truncated conical shape, and air is present in the portion. In addition, as a shape of the light shielding unit in plan view, a polygonal shape, or an oval shape may be used, in addition to the circular shape. In addition, a part of a light shielding unit may be connected to a neighboring light shielding unit, or a part thereof may be omitted. In addition, all of the light shielding units may have the same size, or the same shape, or a size or shape of a part of the light shielding units may be different.

Second Embodiment

Hereinafter, a second embodiment of the present invention will be described using FIGS. 15, 16A and 16B.

A basic configuration of a liquid crystal display device according to the embodiment is the same as that in the first embodiment, and is different from that of the first embodiment in that a retardation film is included in the liquid crystal display device in the second embodiment.

Figure 15:
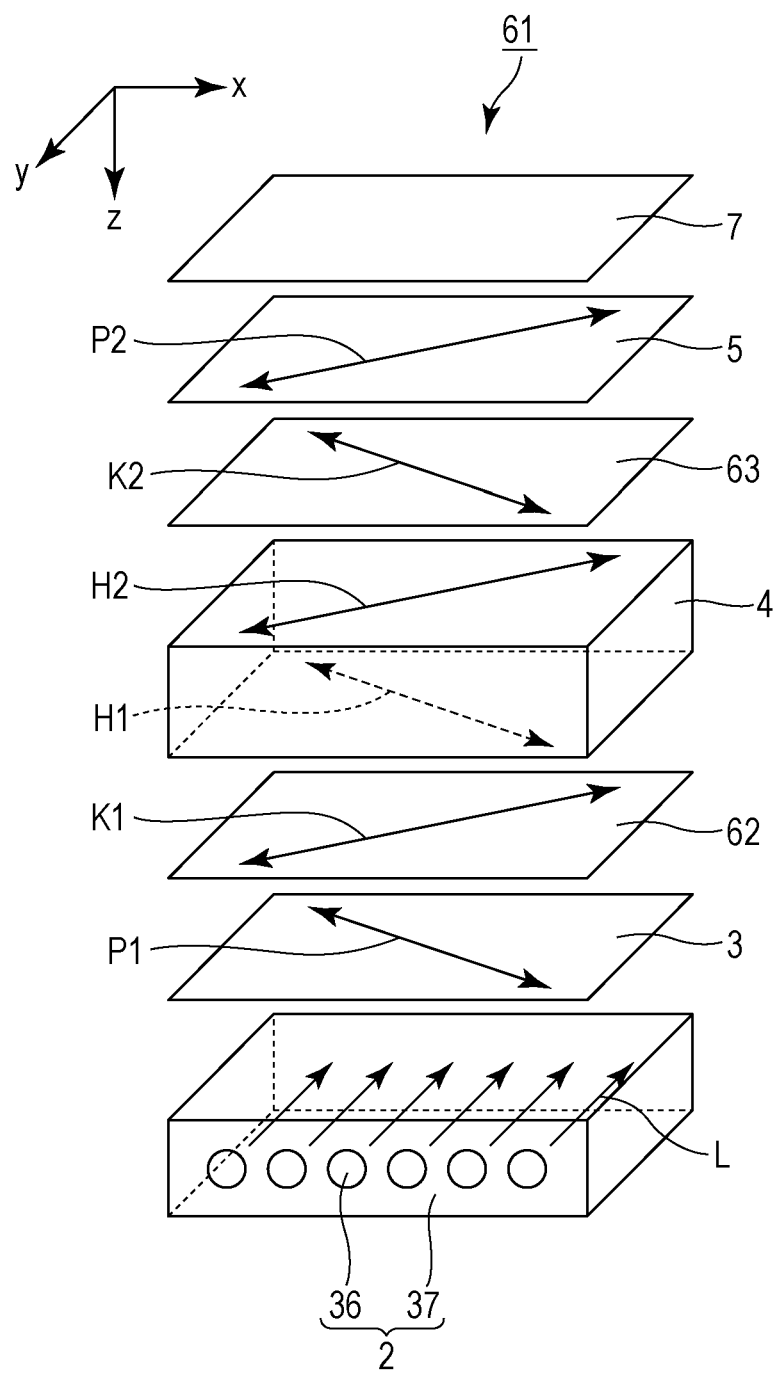
FIG. 15 is a perspective view illustrating a schematic configuration of a liquid crystal display device according to a second embodiment.

In FIG. 15, constituent elements similar to those described in FIG. 1 which are used in the first embodiment are given the same reference numerals, and detailed descriptions thereof will be omitted.

As illustrated in FIG. 15, a liquid crystal display device 61 according to the embodiment includes a first retardation film 62 between a first polarizing layer 3 and a liquid crystal panel 4, and includes a second retardation film 63 between a second polarizing layer 5 and the liquid crystal panel 4. According to the embodiment, the same retardation film is used for the first retardation film 62 and the second retardation film 63. Specifically, the first retardation film 62 and the second retardation film 63 are biaxial retardation films in which an in-plane retardation R0 is 60 nm, and a retardation Rth in the thickness direction is 120 nm. An optical axis of the first retardation film 62 is set to K1, and an optical axis of the second retardation film 63 is set to K2. Other configurations than this are the same as those in the first embodiment. The same backlight 2 as that in the first embodiment is used.

According to the embodiment, a phase difference due to a liquid crystal layer 11 is compensated for by including the first retardation film 62 and the second retardation film 63, and view angle characteristics are improved.

Figure 16A:
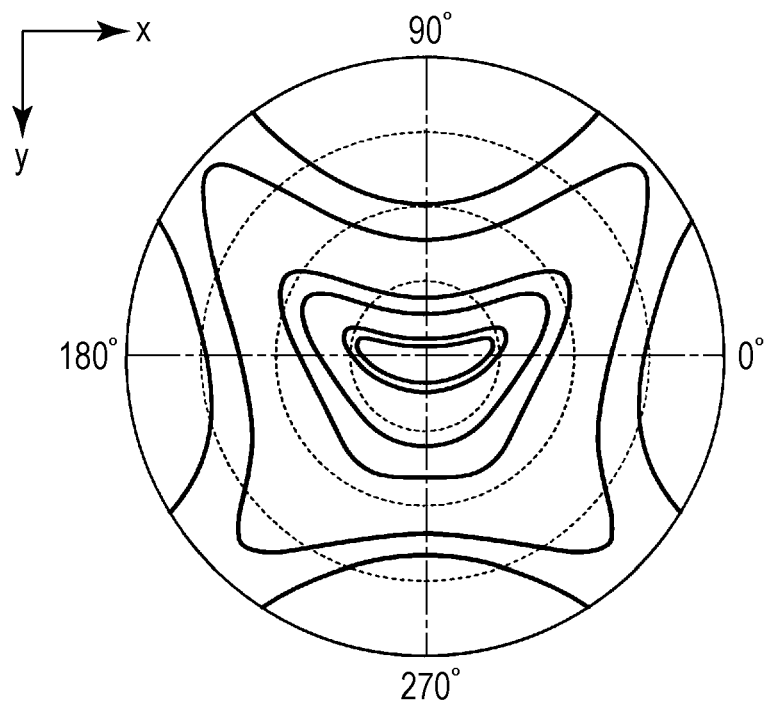
FIG. 16A is a diagram illustrating iso-contrast curves in the liquid crystal display device according to the second embodiment.

FIG. 16A illustrates iso-contrast curves of the liquid crystal display device 61 according to the embodiment. Six iso-contrast curves have a high contrast ratio toward the inside from the outside, and the contrast ratios thereof are 5, 10, 50, 100, 500, and 1,000, respectively. All of four iso-contrast curves have rotationally asymmetric shapes, and have shapes which extend in the direction of an azimuth angle φ of 0° to 180°, and contract in the direction of an azimuth angle φ of 90° to 270°. However, when comparing the iso-contrast curves according to the embodiment to the iso-contrast curves according to the first embodiment (refer to FIG. 8) in which the compensation for the phase difference is not performed, a region with a high contrast ratio extends in the direction of the azimuth angle φ of 0° to 180°. That is, according to the embodiment, view angle characteristics in the direction of the azimuth angle φ of 0° to 180° are improved as compared to that in the first embodiment.

Figure 16B:
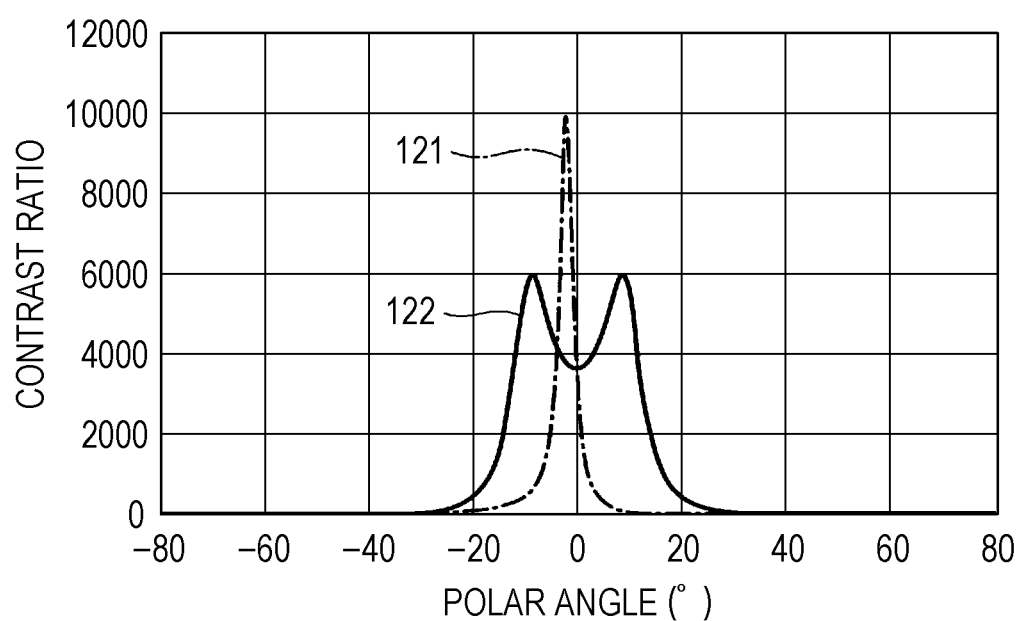
FIG. 16B is a graph illustrating contrast distribution in two directions on a screen.

FIG. 16B illustrates a contrast distribution in the direction of the azimuth angle φ of 0° to 180°, and in the direction of the azimuth angle φ of 90° to 270° in FIG. 16A using a graph. A horizontal axis in FIG. 16B denotes a polar angle [°]. A vertical axis in FIG. 16B denotes a contrast ratio. The contrast distribution in the direction of the azimuth angle φ of 0° to 180° is denoted by a solid line 121. The contrast distribution in the direction of the azimuth angle φ of 90° to 270° is denoted by a dot dashed line 122.

The contrast distribution in the direction of the azimuth angle φ of 90° to 270° has one peak, and an angle range with a high contrast ratio is relatively narrow. In contrast to this, the contrast distribution in the azimuth angle φ of 0° to 180° has two peaks, and an angle range with a high contrast ratio is relatively wide. That is, a view angle in the direction of the azimuth angle φ of 90° to 270° is relatively narrow, and a view angle in the direction of the azimuth angle φ of 0° to 180° is relatively wide. In addition, when comparing the direction of the azimuth angle φ of 90° to the direction of azimuth angle φ of 270°, a view angle in the direction of the azimuth angle φ of 90° is relatively narrow, and a view angle in the direction of the azimuth angle φ of 270° is relatively wide.

Also in the liquid crystal display device 61 according to the embodiment, similarly to that in the first embodiment, the liquid crystal panel 4 and the backlight 2 are arranged so that the direction of the azimuth angle φ of 90° in which a view angle of the liquid crystal panel 4 is the narrowest angle, and the direction of the azimuth angle φ of 90° in which an intensity of light which is output from the backlight 2 is the smallest amount match. Due to the arrangement, there is not much light input from the backlight 2 in a direction of an azimuth angle in which the view angle of the liquid crystal panel 4 is relatively narrow. As a result, a leak of light in a black display portion is suppressed, and it is possible to suppress grayscale inversion which is caused when the liquid crystal panel is viewed from a diagonal direction. In addition, since the liquid crystal display device 61 according to the embodiment includes a light control film 7, an angular distribution of light which is input to the light control film 7 spreads in all directions. As a result, it is possible to realize a liquid crystal display device with excellent view angle characteristics. In particular, it is possible to further improve the view angle characteristics as compared to that in the first embodiment, by performing phase difference compensation using the first retardation film 62 and the second retardation film 63.

Similarly to the first embodiment, even in the liquid crystal display device 61 according to the embodiment, the direction of the azimuth angle φ of 90° in which the view angle of the liquid crystal panel 4 is the narrowest angle, and the direction of the azimuth angle φ of 270° in which an intensity of light which is output from the backlight 2 is the second smallest amount to the direction of azimuth angle φ of 90° may be matched.

Third Embodiment

Hereinafter, a third embodiment of the present invention will be described using FIGS. 17, 18A and 18B.

A basic configuration of a liquid crystal display device according to the embodiment is the same as that in the second embodiment, and is different from that of the second embodiment in that a VA mode liquid crystal display device is included in the embodiment.

Figure 17:
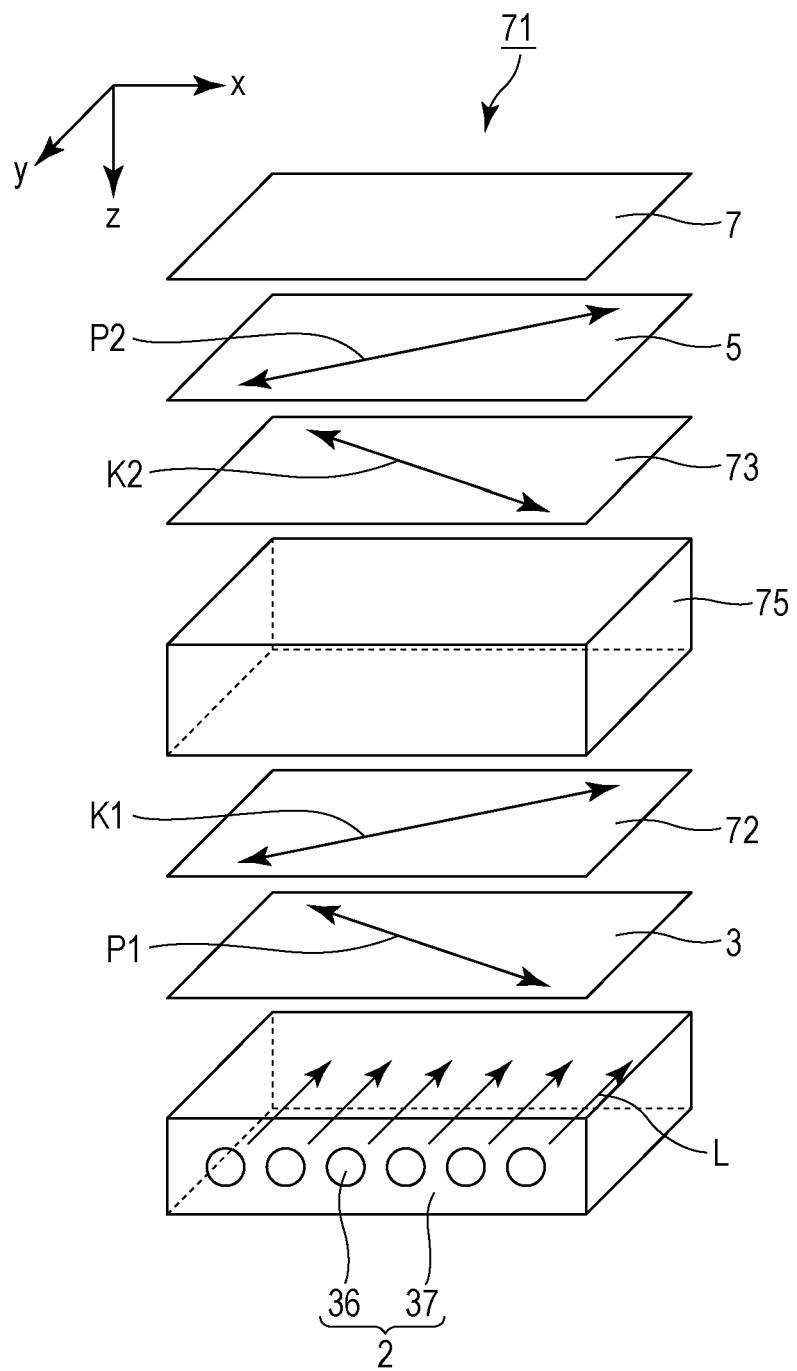
FIG. 17 is a perspective view illustrating a schematic configuration of a liquid crystal display device according to a third embodiment.

In FIG. 17, constituent elements similar to those described in FIG. 15 which are used in the second embodiment are given the same reference numerals, and detailed descriptions thereof will be omitted.

As illustrated in FIG. 17, a liquid crystal display device 71 according to the embodiment includes a backlight 2, a first polarizing plate 3, a first retardation film 72, a VA mode liquid crystal panel 75, a second retardation film 73, a second polarizing plate 5, and a light control film 7. The first retardation film 72 and the second retardation film 73 are biaxial retardation films in which an in-plane retardation R0 is 60 nm, and a retardation Rth in the thickness direction is 110 nm. Other configurations than this are the same as those in the first and second embodiments. Also, the same backlight as that in the first and second embodiments is used.

In general, in the VA mode liquid crystal panel, since a liquid crystal layer rarely exhibits birefringence in a front side direction (direction of the normal) to a screen, and a transmission axis of the first polarizing plate and a transmission axis of the second polarizing plate are in a crossed Nicols arrangement, an approximately complete black display is executed. Accordingly, the VA mode liquid crystal panel is advantageous in that a contrast ratio thereof is higher than that in other display modes. However, when the VA mode liquid crystal panel is viewed from a diagonal direction to a screen, due to the facts that a liquid crystal layer exhibits birefringence and a transmission axis of the first polarizing plate and a transmission axis of the second polarizing plate are not completely orthogonal, a leak of light occurs at a time of a black display, and a contrast ratio decreases. As a result, since a view angle is narrowed in the VA mode liquid crystal panel, a wide view angle is obtained by putting a retardation film into the liquid crystal panel.

Figure 18A:
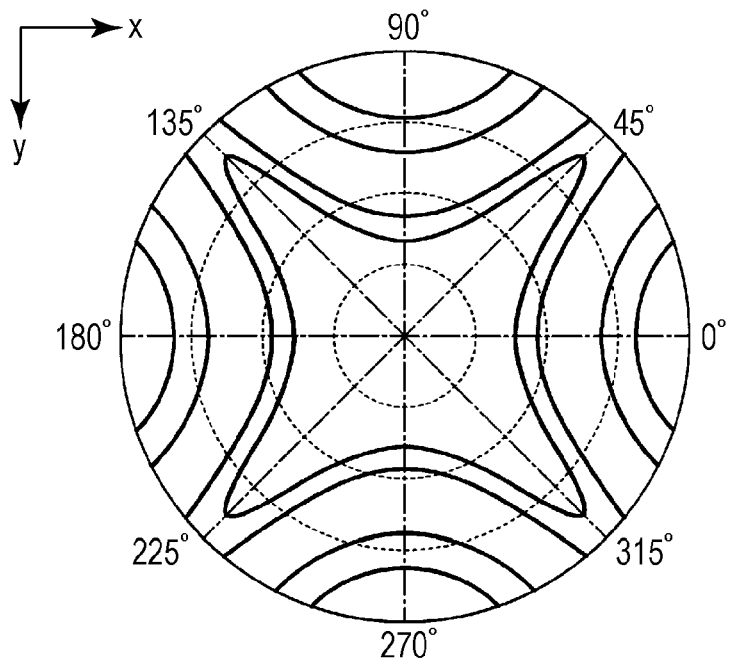
FIG. 18A is a diagram illustrating iso-contrast curves of the liquid crystal display device according to the third embodiment.

FIG. 18A illustrates iso-contrast curves of the liquid crystal display device 71 according to the embodiment. Four iso-contrast curves have a high contrast ratio toward the inside from the outside, and the contrast ratios thereof are 50, 100, 500, and 1,000, respectively. The four iso-contrast curves have rotationally asymmetric shapes, in which a region with a high contrast ratio largely extends in a direction of an azimuth angle φ of 45° to 225°, and in a direction of an azimuth angle φ of 135° to 315° in particular. When comparing the iso-contrast curves according to the embodiment to the iso-contrast curves in the TN mode according to the first and second embodiments (refer to FIGS. 8B and 16A), it is understood that the view angle characteristics are improved.

Figure 18B:
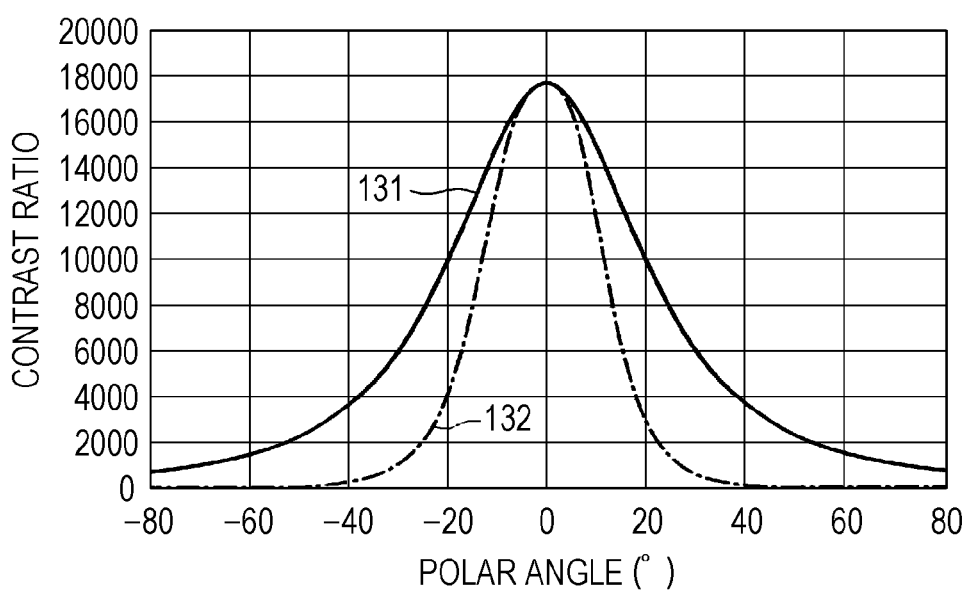
FIG. 18B is a graph illustrating contrast distribution in two directions on a screen.

FIG. 18B illustrates a contrast distribution in the direction of the azimuth angle φ of 45° to 225°, and in the direction of the azimuth angle φ of 90° to 270° in FIG. 18A using a graph. A horizontal axis in FIG. 18B denotes a polar angle [°]. A vertical axis in FIG. 18B denotes a contrast ratio. The contrast distribution in the direction of the azimuth angle φ of 45° to 225° is denoted by a solid line 131. The contrast distribution in the direction of the azimuth angle φ of 90° to 270° is denoted by a dot dashed line 132.

In the contrast distribution in the direction of the azimuth angle φ of 90° to 270°, an angle range with a high contrast ratio is relatively narrow. In contrast to this, in the contrast distribution in the direction of the azimuth angle φ of 45° to 225°, an angle range with a high contrast ratio is relatively wide. That is, a view angle in the direction of the azimuth angle φ of 90° to 270° is relatively narrow, and a view angle in the direction of the azimuth angle φ of 45° to 225° is relatively wide. In addition, when comparing the direction of the azimuth angle φ of 90° to the direction of the azimuth angle φ of 270°, a view angle in the direction of the azimuth angle φ of 90° is relatively narrow, and a view angle in the direction of the azimuth angle φ of 270° is relatively wide.

Also in the liquid crystal display device 71 according to the embodiment, similarly to that in the first and second embodiments, the liquid crystal panel 75 and the backlight 2 are arranged so that the direction of the azimuth angle φ of 90° in which a view angle of the liquid crystal panel 75 is the narrowest angle, and the direction of the azimuth angle φ of 90° in which an intensity of light which is output from the backlight 2 is the smallest amount match. Due to the arrangement, there in not much light input from the backlight 2 in a direction of an azimuth angle in which the view angle of the liquid crystal panel 75 is relatively narrow. As a result, a leak of light in a black display portion is suppressed, and it is possible to suppress grayscale inversion which is caused when the liquid crystal panel 75 is viewed from a diagonal direction. In addition, since the liquid crystal display device 71 according to the embodiment includes a light control film 7, an angular distribution of light which is input to the light control film 7 spreads in all directions. As a result, it is possible to realize a liquid crystal display device with excellent view angle characteristics. In particular, it is possible to further improve the view angle characteristics as compared to those in the first and second embodiments, using the VA mode liquid crystal panel 75.

Also in the liquid crystal display device 71 according to the embodiment, similarly to that in the first and second embodiments, the direction of the azimuth angle φ of 90° in which a view angle of the liquid crystal panel 75 is the narrowest angle, and the direction of the azimuth angle φ of 270° in which an intensity of light which is output from the backlight 2 is the second smallest amount to the direction of azimuth angle φ of 90° may be matched.

In addition, a technical range according to aspects of the present invention is not limited to the above described embodiments, and it is possible to add various changes without departing from the scope of the present invention. For example, in the above described embodiments, the edge-lit backlight in which a light source is arranged at an end face of a light guide is used as the backlight, however, instead of this configuration, a direct-lighting backlight in which the light source is arranged right below the light guide may be adopted.

In the above described embodiments, an example in which directivity is given to the backlight using a wedge-shaped light guide is described, however, as means for applying directivity to the backlight, other means, for example, forming a plurality of prism structures on the lower face of the light guide may be used. In addition, even in a case in which a backlight in which means for applying directivity is not particularly provided is used, a direction in which a luminance distribution of light which is output from the backlight is narrow, that is, a direction in which a light intensity is small may be matched with a direction in which a view angle of the liquid crystal panel is narrow.

An azimuth angle direction in which a view angle of the liquid crystal panel is relatively narrow, and an azimuth angle direction in which an intensity of light from the backlight is relatively small may not necessarily match completely, and may be approximately matched. In general, in a process of assembling the liquid crystal display device, a deviation in alignment in a rotation direction of the liquid crystal panel and the backlight is considered to be approximately 3° or less. Accordingly, even a case where the azimuth angle direction in which the view angle of the liquid crystal panel is relatively narrow and the azimuth angle direction in which the intensity of light from the backlight is relatively small are deviated by approximately 3° is also included in the technical range of the aspects of the present invention.

In addition, a configuration may be adopted in which at least one of a reflection protecting layer, a polarizing filter layer, an antistatic layer, an antiglare treatment layer, and a stain-proof treatment layer is provided on a viewing side of the base of the light control film in the above described embodiments. According to the configuration, it is possible to add a function of reducing a reflection of outer light, a function of preventing attaching of dust or soil, a function of preventing scratches, or the like, depending on a type of a layer which is provided on the viewing side of the base, and to prevent aging deterioration of view angle characteristics.

In addition, according to the above described embodiments, the light diffusion unit has the truncated conical shape, or a shape of the polygonal frustum, however, an inclined angle of the side face of the light diffusion unit may not necessarily be symmetric with respect to the optical axis as the center. When the shape of the light diffusion unit is set to the truncated conical shape, or the shape of the polygonal frustum as in the above described embodiments, since the inclined angle of the side face of the light diffusion unit is symmetric having the optical axis as the center, it is possible to obtain an angular distribution which is symmetric with respect to the optical axis as the center. In contrast to this, when an asymmetric angular distribution is intentionally required according to a use or a way of using a display device, for example, when there is a desire for a wide view angle only on the upper side, or only on the right side of a screen, or the like, the inclined angle of the side face of the light diffusion unit may be asymmetric.

In addition, a specific configuration relating to a material, the number, and an arrangement of each constituent element of the liquid crystal display device is not limited to the above described embodiments, and appropriate changes can be made. For example, according to the above described embodiments, an example in which the polarizing plate, or the retardation film is arranged on the outer side of the liquid crystal panel is described, however, instead of this configuration, a polarizing layer or a retardation layer may be formed on the inner side of a pair of substrates which configure a liquid crystal panel.

EXAMPLES

Inventors of the present invention compared an occurrence situation of grayscale inversion between the liquid crystal display device in the aspects of the present invention and the liquid crystal display device in the related art, in order to verify the effect in the aspects of the present invention. In addition, the contrast ratio on the front face of the liquid crystal display device in the aspects of the present invention was compared to that of the liquid crystal display device in a comparison example. Hereinafter, a comparison result thereof will be described.

[Occurrence Situation of Grayscale Inversion]

As Example 1, the same liquid crystal display device as that in the first embodiment was prepared in which the liquid crystal panel of the TN mode is used and the azimuth angle direction in which the view angle of the liquid crystal panel is the smallest angle, and the azimuth angle direction in which the intensity of light from the backlight is the smallest amount are matched. On the other hand, as an example in the related art, a liquid crystal display device was prepared in which the liquid crystal panel of the TN mode is used, a light control film is not included, and the azimuth angle direction in which the view angle of the liquid crystal panel is relatively narrow, and the azimuth angle direction in which the intensity of light from the backlight is relatively large are matched. Then, an actual display state in the liquid crystal display device in Example 1, and an actual display state in the liquid crystal display device in the example in the related art were compared with each other.

Figure 19A:
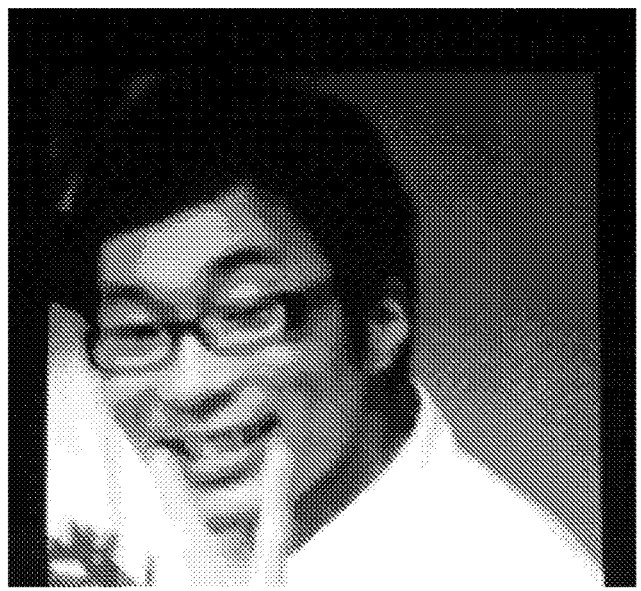
FIG. 19A is a photograph showing a display result of a liquid crystal display device according to an example of the present invention, and is taken from a front side direction to a display screen.
Figure 19B:
FIG. 19B is a photograph showing a display result of the liquid crystal display device according to the example of the present invention, and is taken from a lower diagonal direction of 45° to the display screen.

FIGS. 19A and 19B are pictures of photographed screens when a display is performed in the liquid crystal display device in Example 1. FIG. 19A is a picture which is taken from the front side direction to the screen, and FIG. 19B is a picture which is taken from a lower diagonal direction of 45° (45° polar angle) to the screen.

Figure 20A:
FIG. 20A is a photograph showing a display result of a liquid crystal display device of a comparison example, and is a photograph which is taken from a front side direction to the display screen.
Figure 20B:
FIG. 20B is a photograph showing a display result of a liquid crystal display device of a comparison example, and is taken from a lower diagonal direction of 45° to the display screen.

FIGS. 20A and 20B are pictures of photographed screens when a display is performed in the liquid crystal display device in the related art. FIG. 20A is a picture which is taken from the front side direction to the screen, and FIG. 20B is a picture which is taken from a lower diagonal direction of 45° (45° polar angle) to the screen.

As is understood from FIGS. 20A and 20B, there is not a particular problem, when the screen is viewed from the front side direction to the screen in the liquid crystal display device in the related art, however, when the screen is viewed from the lower diagonal direction of 45° to the screen, grayscale inversion occurs, and viewability of an image extremely deteriorates. In contrast to this, as is understood from FIGS. 19A and 19B, it is understood that there is no grayscale inversion, and viewability of an image can be secured in the liquid crystal display device in Example 1, though contrast slightly deteriorates when the screen is viewed from the lower diagonal direction of 45° to the screen as compared to the case in which the screen is viewed from the front side direction to the screen.

[Contrast Ratio on Front Side]

Three types of liquid crystal display devices have been manufactured by combining directive backlights of three types of which output light intensities are different, and a liquid crystal panel in which an isotropic light scattering layer is attached to a light control film, respectively.

As Example 2, a liquid crystal display device was manufactured in which an azimuth angle direction in which an amount of output light of the backlight is smallest, and an azimuth angle direction in which a region in which a contrast ratio of the TN liquid crystal panel is equal to or greater than 1,000 is narrowest are matched.

As Example 3, a liquid crystal display device was manufactured in which an azimuth angle direction in which output light of the backlight is second smallest, and an azimuth angle direction in which a region where a contrast ratio of the TN liquid crystal panel is equal to or greater than 1,000 is narrowest are matched.

As a comparison example, a liquid crystal display device was manufactured in which an azimuth angle direction in which output light of the backlight is large, and an azimuth angle direction in which the region where the contrast ratio of the TN liquid crystal panel is equal to or greater than 1,000 is narrowest are matched.

Figure 21A:
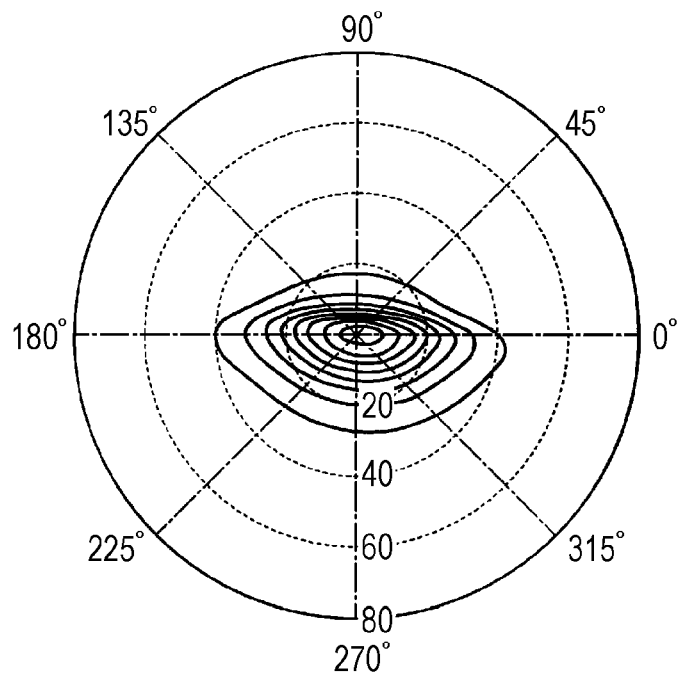
FIG. 21A is a diagram illustrating light distribution characteristics of a backlight of a liquid crystal display device according to a first example of the present invention.
Figure 21B:
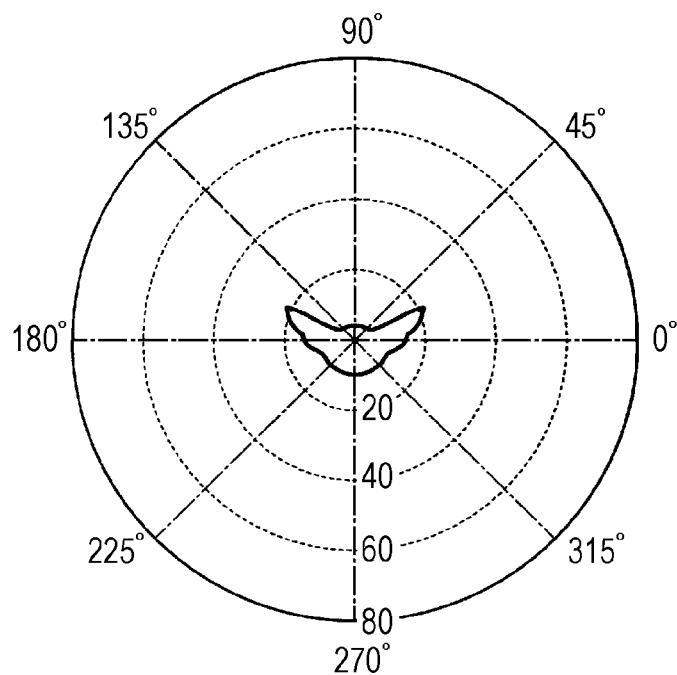
FIG. 21B is a diagram illustrating iso-contrast curves of a liquid crystal panel of the liquid crystal display device according to the first example of the present invention.

FIG. 21A illustrates iso-luminance curves which denote a light distribution property of the backlight in Example 2. Eight iso-luminance curves are curves in which luminance becomes higher toward the inside from the outside, and of which luminance is 1,000, 2,000, 3,000, 4,000, 5,000, 6,000, 7,000, and 8,000 [cd/m$^2$], respectively. FIG. 21B illustrates an iso-contrast curve of which the contrast ratio is 1,000, in the TN liquid crystal panel in Example 2.

Figure 22A:
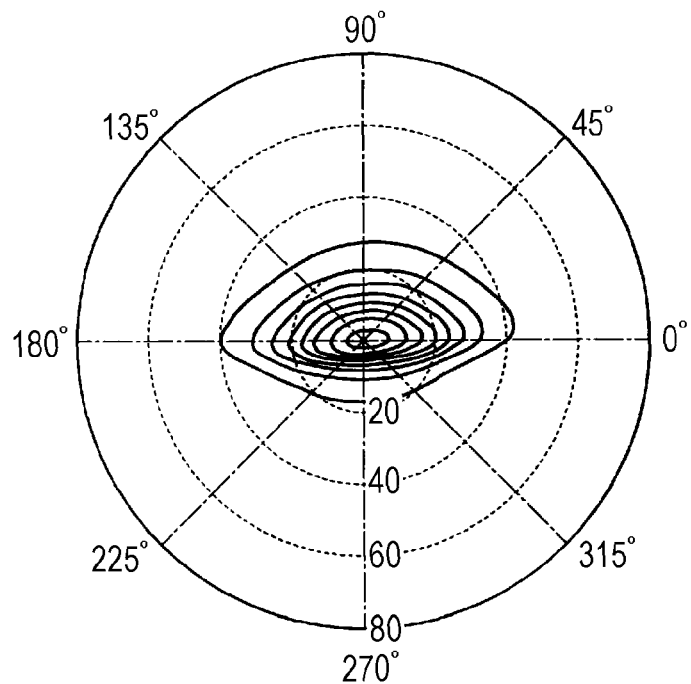
FIG. 22A is a diagram illustrating light distribution characteristics of a backlight of a liquid crystal display device according to a second example of the present invention.
Figure 22B:
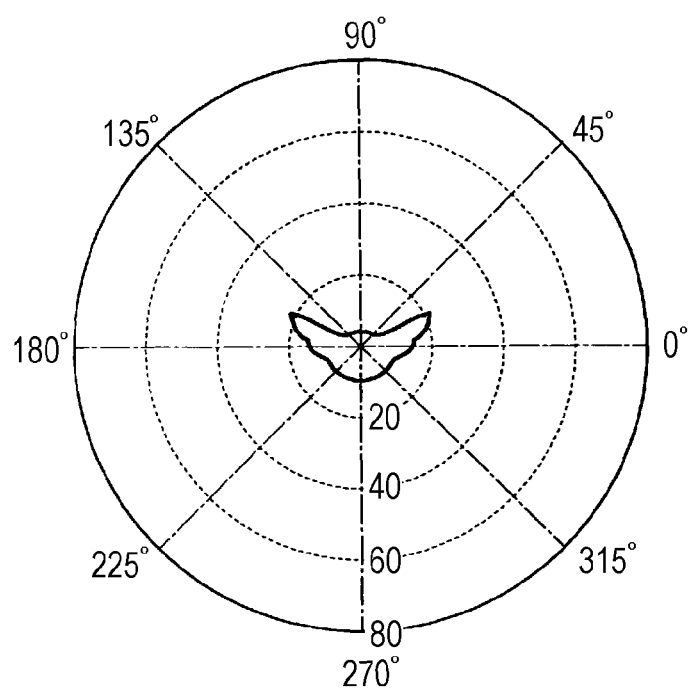
FIG. 22B is a diagram illustrating iso-contrast curves of a liquid crystal panel of the liquid crystal display device according to the second example of the present invention.

FIG. 22A illustrates iso-luminance curves which denote light distribution of the backlight in Example 3. Eight iso-luminance curves are curves in which luminance becomes higher toward the inside from the outside, and of which luminance is 1,000, 2,000, 3,000, 4,000, 5,000, 6,000, 7,000, and 8,000 [cd/m$^2$], respectively. FIG. 22B illustrates an iso-contrast curve of which the contrast ratio is 1,000, in the TN liquid crystal panel in Example 3.

Figure 23A:
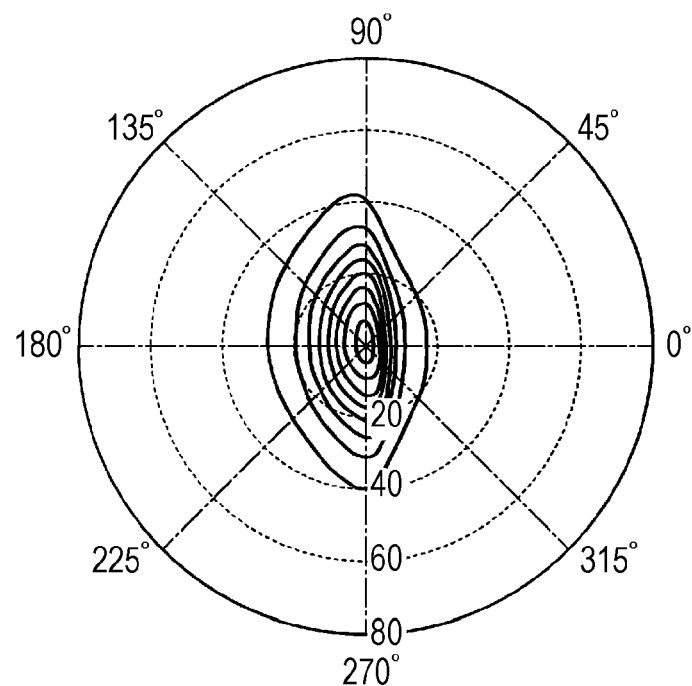
FIG. 23A is a diagram illustrating light distribution characteristics of a backlight of a liquid crystal display device in an example in the related art.
Figure 23B:
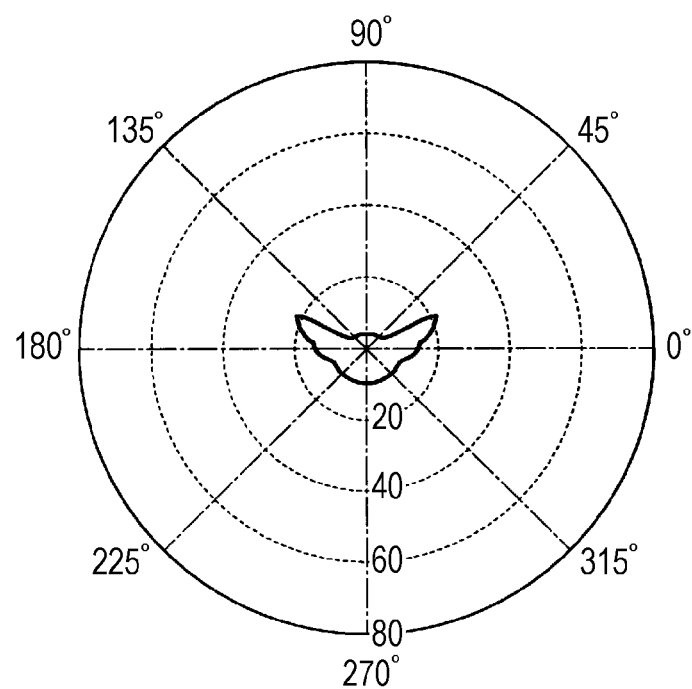
FIG. 23B is a diagram illustrating iso-contrast curves of a liquid crystal panel of the liquid crystal display device in the example in the related art.

FIG. 23A illustrates iso-luminance curves which denote light distribution characteristics of the backlight in the comparison example. Eight iso-luminance curves are curves in which luminance becomes higher toward the inside from the outside, and of which luminance is 1,000, 2,000, 3,000, 4,000, 5,000, 6,000, 7,000, and 8,000 [cd/m$^2$], respectively. FIG. 23B illustrates an iso-contrast curve of which the contrast ratio is 1,000 in the TN liquid crystal panel in the comparison example.

A contrast ratio in the front side direction of a screen was measured with respect to the liquid crystal display device in Example 2, Example 3, and the comparison example. A measurement result thereof is illustrated in [Table 1].

TABLE 1

| Sample | Example 2 | Example 3 | Comparison example |
|---|---|---|---|
| Front side contrast ratio | 500:1 | 400:1 | 150:1 |

As is understood from Table 1, in Example 2 in which the azimuth angle direction in which the amount of output light of the backlight is smallest, and the azimuth angle direction in which the region in which the contrast ratio of the TN liquid crystal panel is equal to or greater than 1,000 is narrowest are matched, an intensity of light which is input from the backlight in the azimuth angle direction in which the view angle of the TN liquid crystal panel is narrow is small. Accordingly, a contrast ratio on the front side of the liquid crystal display device was denoted by a high value of 500:1. Similarly, in Example 3 in which the azimuth angle direction in which the amount of output light of the backlight is second smallest, and the azimuth angle direction in which the region in which the contrast ratio of the TN liquid crystal panel is equal to or greater than 1,000 is narrowest are matched, an intensity of light which is input from the backlight in the azimuth angle direction in which the view angle of the TN liquid crystal panel is narrow is small. Accordingly, a contrast ratio on the front side of the liquid crystal display device was denoted by a high value of 400:1, though the value is slightly low as compared to that in Example 2.

In contrast to this, in the comparison example in which the azimuth angle direction in which the amount of output light of the backlight is large, and the azimuth angle direction in which the region in which the contrast ratio of the TN liquid crystal panel is equal to or greater than 1,000 is narrowest are matched, an intensity of light which is input from the backlight in the azimuth angle direction in which the view angle of the TN liquid crystal panel is narrow is large. Accordingly, light which deteriorates contrast characteristics is diffused in all directions by a light control film to which is attached an isotropic scattering layer. As a result, a contrast ratio on the front side of the liquid crystal display device was denoted by a value of 150:1 which is low as compared to the values in Examples 2 and 3.

INDUSTRIAL APPLICABILITY

The aspects of the present invention can be used in a liquid crystal display device which is used in various displays, or a display unit or the like of a mobile electronic device, for example.

REFERENCE SIGNS LIST 1, 61, 71 LIQUID CRYSTAL DISPLAY DEVICE
2 BACKLIGHT (LIGHTING DEVICE)
3 FIRST POLARIZING PLATE (POLARIZING LAYER)
4, 75 LIQUID CRYSTAL PANEL
5 SECOND POLARIZING PLATE (POLARIZING LAYER)
7, 7D, 7E, 7F, 7G LIGHT CONTROL FILM (OUTPUT ANGLE CONTROL MEMBER)
36 LIGHT SOURCE
37 LIGHT GUIDE
39 BASE
40, 40D, 40E, 40G LIGHT DIFFUSION UNIT
41, 41G LIGHT SHIELDING LAYER (LIGHT SHIELDING UNIT)
50 LIGHT DIFFUSION FILM (LIGHT SCATTERING LAYER)
62, 72 FIRST RETARDATION FILM (PHASE DIFFERENCE COMPENSATION LAYER)
63, 73 SECOND RETARDATION FILM (PHASE DIFFERENCE COMPENSATION LAYER)

The invention claimed is:

1. A liquid crystal display device comprising:
a liquid crystal panel including a pair of substrates and a liquid crystal layer which is interposed between the pair of substrates;
a pair of polarizing layers which are arranged on a light input side and a light output side of the liquid crystal layer;
a lighting device which is arranged on the light input side of the liquid crystal panel and radiates light toward the liquid crystal panel;
an output angle control member which is arranged on the light output side of the liquid crystal panel and controls an output angle of light which is output from the liquid crystal panel; and
a light scattering layer, provided on a view side of the output angle control member, which scatters light output from the output angle control member, wherein
the lighting device has a direction in which a light distribution of the light which is radiated toward the liquid crystal panel is a first distribution and a direction in which the light distribution of the light which is radiated toward the liquid crystal panel is a second distribution that is wider than the first distribution, and
a first azimuth angle direction in which a view angle of the liquid crystal panel is relatively narrow, and the direction in which the light distribution of the light which is radiated toward the liquid crystal panel from the lighting device is the first distribution approximately match in a second azimuth angle direction which is viewed from a direction normal to the liquid crystal panel.

2. The liquid crystal display device according to claim 1, wherein, among a plurality of iso-contrast curves which denote view angle dependency of contrast of the liquid crystal panel, at least an iso-contrast curve of which contrast is relatively high has a rotationally asymmetric shape in the second azimuth angle direction, and wherein the first azimuth angle direction corresponds to a direction in which a region surrounded with the iso-contrast curve having the rotationally asymmetric shape is relatively narrow.

3. The liquid crystal display device according to claim 1, wherein, among a plurality of iso-luminance curves which denote a luminance distribution of light which is output from the lighting device, at least an iso-luminance curve of which luminance is relatively high has a rotationally asymmetric shape in the second azimuth angle direction which is viewed from a direction normal to the liquid crystal panel, and wherein a third azimuth angle direction in which the intensity of light radiated toward the liquid crystal panel from the lighting device is relatively small includes a direction in which a region surrounded with the iso-luminance curve having the rotationally asymmetric shape is relatively narrow.

4. The liquid crystal display device according to claim 1, wherein the lighting device includes a light guide which propagates, inside thereof, light input from an end face and which outputs the light from a main face, and a light source which is provided at the end face of the light guide, and wherein a third azimuth angle direction in which the light intensity is relatively small is a propagation direction of light in the light guide.

5. The liquid crystal display device according to claim 1, wherein the light scattering layer scatters forward isotropically light which is output from the output angle control member.

6. The liquid crystal display device according to claim 1, wherein the first azimuth angle direction matches a vertical direction of a display screen of the liquid crystal panel.

7. The liquid crystal display device according to claim 1, further comprising
on at least one side of the light input side and the light output side of the liquid crystal layer, a phase difference compensation layer which compensates for a phase difference of the liquid crystal layer.

8. The liquid crystal display device according to claim 1, wherein the output angle control member includes a base with light permeability, a light diffusion unit which is formed on one face of the base, and a light shielding unit which is formed on the one face of the base in a region other than a region where the light diffusion unit is formed, wherein the light diffusion unit has a light output end face on the base side, wherein the light diffusion unit has a light input end face with an area larger than an area of the light output end face on a side opposite to the base side, wherein a height of the light diffusion unit from the light input end face to the light output end face is larger than a height of the light shielding unit, and wherein a substance with a refractive index smaller than that of the light diffusion unit is present in a gap around the light diffusion unit in a region in which the light diffusion unit is not formed.

9. The liquid crystal display device according to claim 8, wherein the output angle control member includes a plurality of the light diffusion units, and the plurality of light diffusion units are scattered on one surface of the base.

10. The liquid crystal display device according to claim 9, wherein the plurality of light diffusion units are non-cyclically arranged when viewed from a direction normal to the one face of the base.

11. The liquid crystal display device according to claim 9, wherein a dimension or a shape of the light output end face of at least one light diffusion unit among the plurality of light diffusion units is different from a dimension or a shape of the light output end face of another light diffusion unit.

12. The liquid crystal display device according to claim 9, wherein an inclined angle of a side surface of at least one light diffusion unit among the plurality of light diffusion units is different from an inclined angle of a side surface of another light diffusion unit.

13. The liquid crystal display device according to claim 9, wherein an inclined angle of a side face of at least one light diffusion unit among the plurality of light diffusion units is changed toward the light output end face from the light input end face.

14. The liquid crystal display device according to claim 8, wherein the output angle control member includes a plurality of light shielding units, and the plurality of light shielding units are scattered on one surface of the base.

15. The liquid crystal display device according to claim 14, wherein the plurality of light shielding units are non-cyclically arranged when viewed from the direction normal to the one face of the base.

16. The liquid crystal display device according to claim 14, wherein a dimension or a shape of at least one light shielding unit among the plurality of light shielding units is different from a dimension or a shape of another light shielding unit.

17. The liquid crystal display device according to claim 8, wherein a substance having a refractive index smaller than that of the light diffusion unit is air.

18. The liquid crystal display device according to claim 8, wherein the light shielding layer is made of any one of a black resin, black ink, a single metal element, and a multilayer film including a single metal element and metal oxide.

* * * * *